United States Patent
Luo et al.

(10) Patent No.: US 12,068,898 B2
(45) Date of Patent: *Aug. 20, 2024

(54) GAP ENHANCEMENT WITH GUARD SYMBOLS AND INDICATION OF TRANSITION INSTANCES

(71) Applicant: QUALCOMM Incorporated, San Diego, CA (US)

(72) Inventors: Jianghong Luo, Skillman, NJ (US); Navid Abedini, Basking Ridge, NJ (US); Luca Blessent, Whitehouse Station, NJ (US); Karl Georg Hampel, Hoboken, NJ (US); Naeem Akl, Somerville, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 578 days.

This patent is subject to a terminal disclaimer.

(21) Appl. No.: 17/141,994

(22) Filed: Jan. 5, 2021

(65) Prior Publication Data

US 2021/0211341 A1 Jul. 8, 2021

Related U.S. Application Data

(60) Provisional application No. 62/958,182, filed on Jan. 7, 2020.

(51) Int. Cl.
*H04L 47/70* (2022.01)
*H04B 7/155* (2006.01)
*H04B 17/382* (2015.01)
*H04L 27/26* (2006.01)
*H04W 72/0446* (2023.01)
*H04W 72/566* (2023.01)
*H04W 72/04* (2023.01)

(52) U.S. Cl.
CPC ......... *H04L 27/2607* (2013.01); *H04B 7/155* (2013.01); *H04B 17/382* (2015.01); *H04L 47/70* (2013.01); *H04W 72/0446* (2013.01); *H04W 72/569* (2023.01); *H04L 27/2666* (2013.01); *H04W 72/04* (2013.01)

(58) Field of Classification Search
CPC ... H04B 17/382; H04L 27/2666; H04L 47/70; H04W 72/04; H04W 36/00; H04W 36/06
See application file for complete search history.

(56) References Cited

U.S. PATENT DOCUMENTS 11,601,937 B2 * 3/2023 Luo ............ H04W 72/51
2021/0051545 A1 * 2/2021 Luo ............ H04W 36/36
2021/0144705 A1 * 5/2021 Li ............ H04W 28/0215
(Continued)

OTHER PUBLICATIONS

U.S. Appl. No. 62/888,395 of You et al. (US-20220141074-A1) (Year: 2023).*

*Primary Examiner* — Salvador E Rivas
(74) *Attorney, Agent, or Firm* — Arent Fox, LLP

(57) ABSTRACT

An integrated access and backhaul (IAB) apparatus receives, from a child IAB node, a signal identifying a set of transition instances for the child IAB node, including a transition time for each transition instance, and provides guard symbols for a first transition instance of the set of transition instances at the transition time for the first transition instance.

31 Claims, 16 Drawing Sheets

(56) References Cited

U.S. PATENT DOCUMENTS

| | | | |
|---|---|---|---|
| 2022/0141074 A1* | 5/2022 | You | H04L 5/0094 |
| | | | 375/262 |
| 2022/0174670 A1* | 6/2022 | Liu | H04L 27/2646 |
| 2022/0182977 A1* | 6/2022 | Miao | H04W 72/51 |
| 2022/0264565 A1* | 8/2022 | Huang | H04W 56/002 |

* cited by examiner

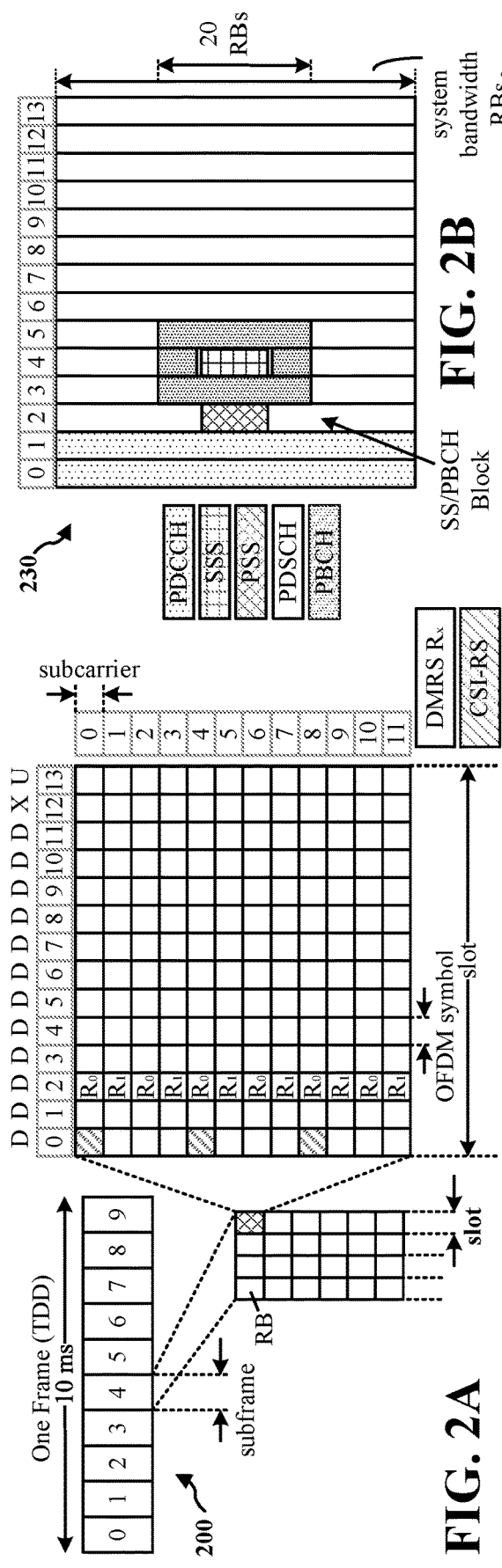
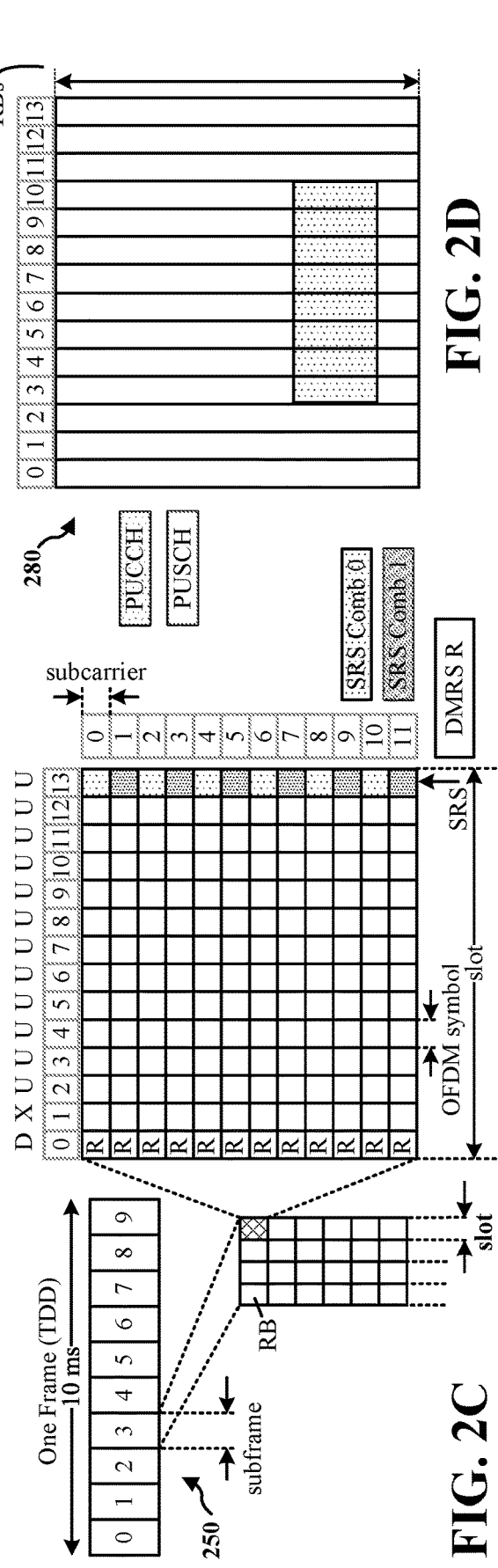

MT to DU TRANSITIONS

| Before (MT) / After (DU) | DL Tx | UL Rx |
|---|---|---|
| DL Rx | Type 1 | Type 2 |
| UL Tx | Type 3 | Type 4 |

DU to MT TRANSITIONS

| Before (DU) / After (MT) | DL Rx | UL Tx |
|---|---|---|
| DL Tx | Type 5 | Type 6 |
| UL Rx | Type 7 | Type 8 |

FIG. 8

GAP ENHANCEMENT WITH GUARD SYMBOLS AND INDICATION OF TRANSITION INSTANCES

CROSS REFERENCE TO RELATED APPLICATION(S)

This application claims the benefit of U.S. Provisional Application Ser. No. 62/958,182, entitled "GAP ENHANCEMENT WITH INDICATION OF TRANSITION INSTANCES" and filed on Jan. 7, 2020, which is expressly incorporated by reference herein in its entirety.

BACKGROUND

Technical Field

The present disclosure relates generally to communication systems, and more particularly, to an IAB network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from a child IAB node, a signal identifying a set of transition instances for the child IAB node to transition between use of a mobile terminal of the child IAB node and use of a distributed unit of the child IAB node, the signal comprising a transition time for each transition instance of the set of transition instances, and provides guard symbols for a first transition instance of the set of transition instances at the transition time for the first transition instance.

In another aspect of the disclosure, a method, a computer-readable medium, and an apparatus are provided. The apparatus transmits, to a child IAB node, a signal identifying a set of transition instances for the child IAB node to transition between use of a mobile terminal of the child IAB node and use of a distributed unit of the child IAB node, the signal comprising a transition time for each transition instance of the set of transition instances, and provides guard symbols for each transition instance of the set of transition instances at the corresponding transition time.

In another aspect of the disclosure, a method, a computer-readable medium, and an apparatus are provided. The apparatus transmits, to a parent IAB apparatus, a signal identifying a set of transition instances for the IAB node to transition between use of a mobile terminal of the IAB node and use of a distributed unit of the IAB node, the signal comprising a transition time for each transition instance of the set of transition instances, and receives guard symbols from the parent IAB apparatus for a first transition instance of the set of transition instances at the transition time for the first transition instance.

In another aspect of the disclosure, a method, a computer-readable medium, and an apparatus are provided. The apparatus receives, from a parent IAB apparatus, a signal identifying a set of transition instances for the IAB node to transition between use of a mobile terminal of the IAB node and use of a distributed unit of the IAB node, the signal comprising a transition time for each transition instance of the set of transition instances, and receives guard symbols from the parent IAB apparatus for each transition instance of the set of transition instances at the corresponding transition time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 8 is a table illustrating IAB node transition types.

DETAILED DESCRIPTION

Figure 1:
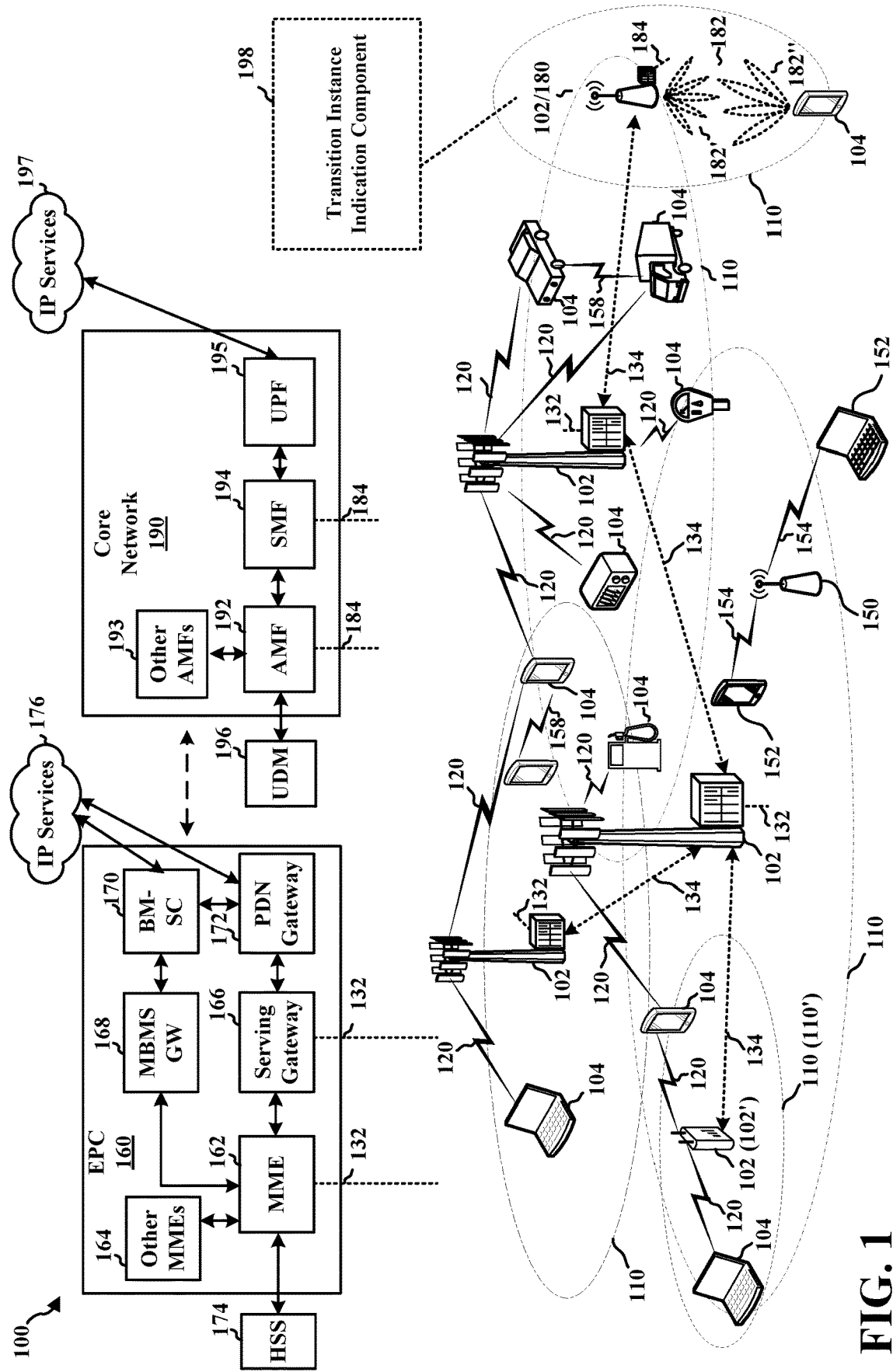
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include a transition instance indication component 198. The base station 180 may be part of an integrated access and backhaul (IAB) network (e.g., may be or may include an IAB node or an IAB donor), and the transition instance indication component 198 may be configured to indicate to a parent IAB node transition instances at which the parent IAB node should provide guard symbols for a child IAB node, and/or may be configured to indicate to a child IAB node transition instance at which the parent IAB node will provide guard symbols. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
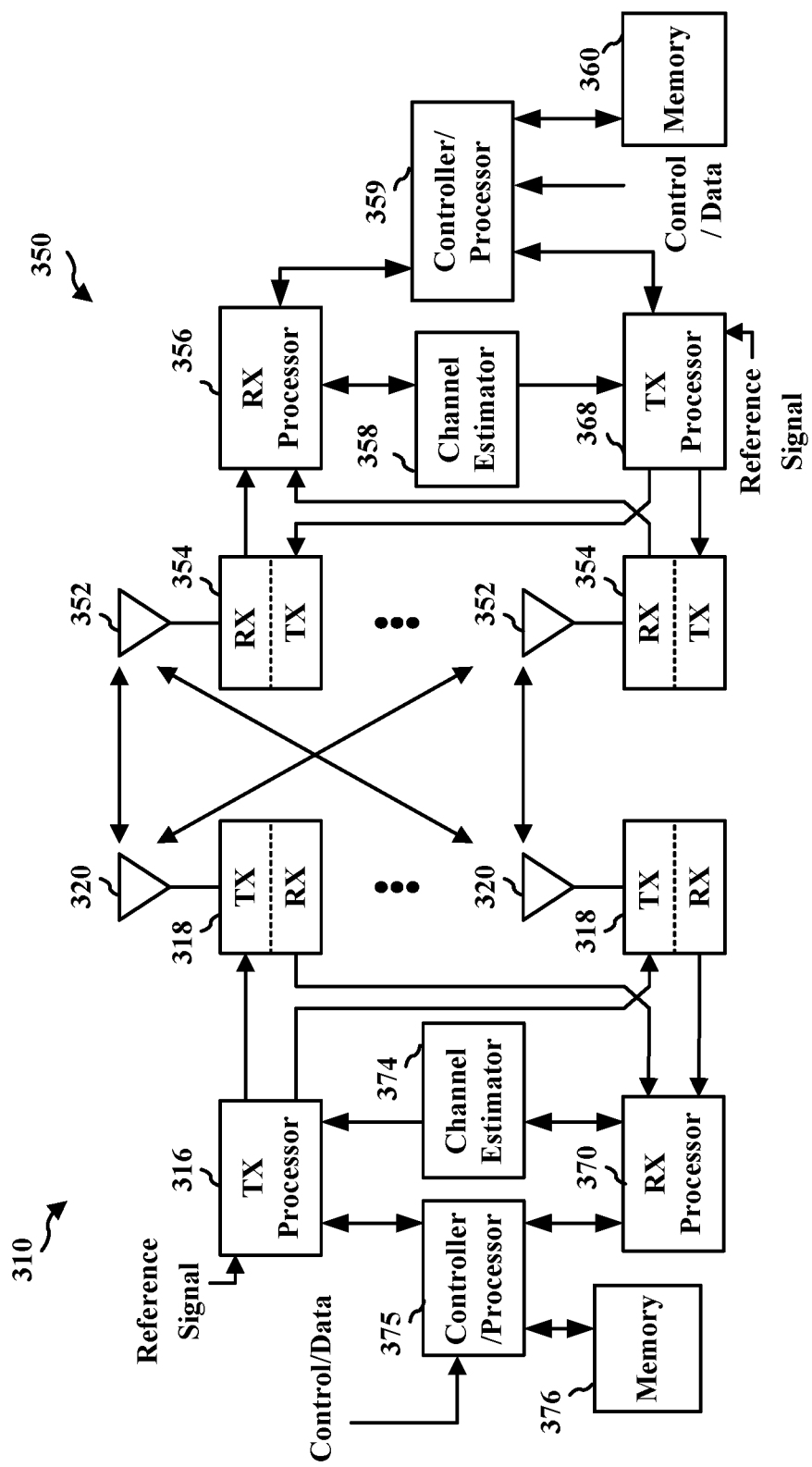
FIG. 3 is a diagram illustrating an example of a base station and user equipment (UE) in an access network.

FIG. 3 is a block diagram of a base station 310 in communication with a UE 350 in an access network. In some aspects, the base station 310 may be an IAB apparatus such as an IAB node or an IAB donor, or may include an IAB apparatus. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

Figure 4:
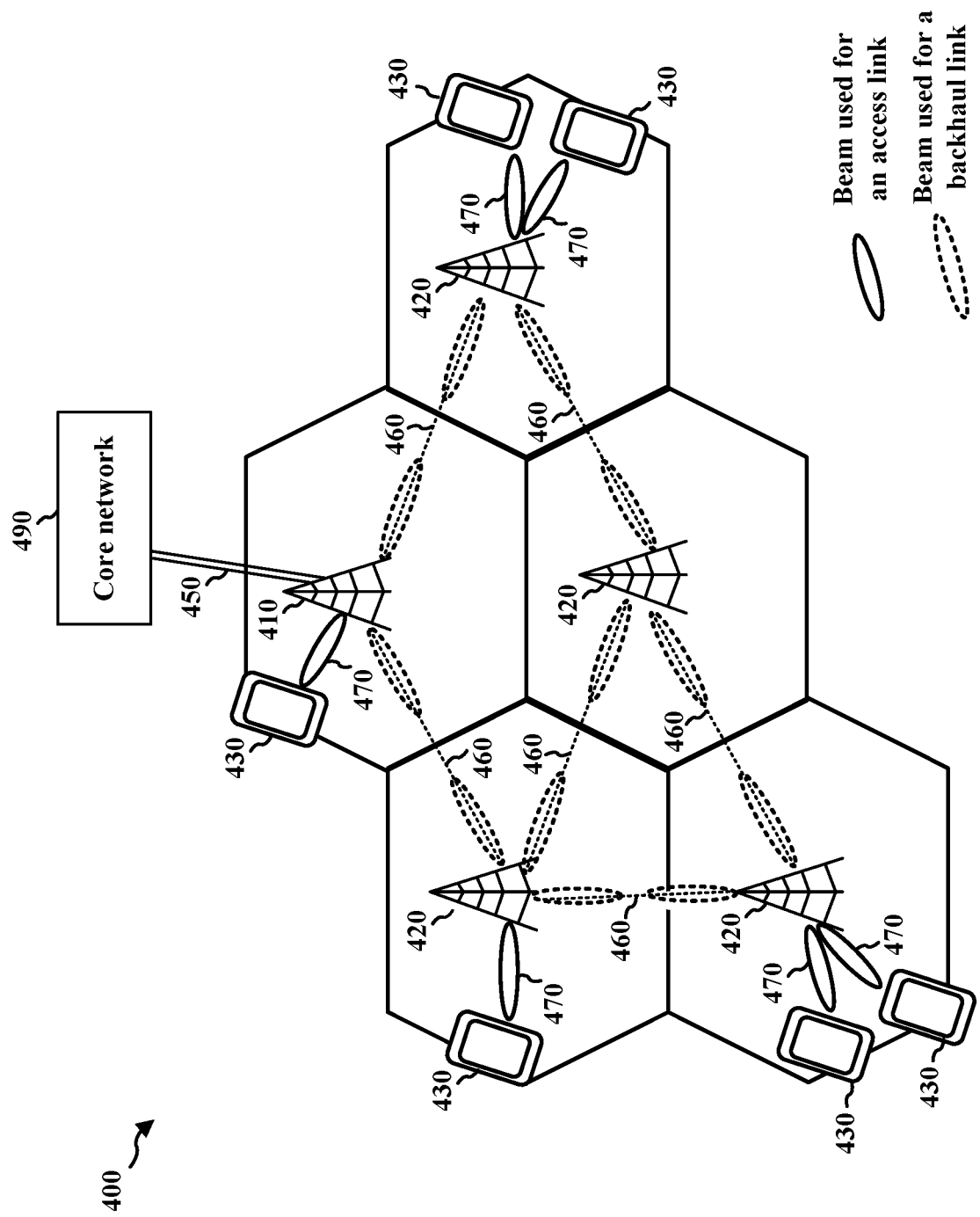
FIG. 4 is a diagram illustrating an integrated access and backhaul (IAB) network.

FIG. 4 is a diagram illustrating an integrated access and backhaul (IAB) network 400. The IAB network 400 may include an anchor node (that may be referred to herein as an "IAB donor") 410 and access nodes (that may be referred to herein as "IAB nodes") 420. The IAB donor 410 may be a base station, such as a gNB or eNB, and may perform functions to control the IAB network 400. The IAB nodes 420 may comprise L2 relay nodes, etc. Together, the IAB donor 410 and the IAB nodes 420 share resources to provide an access network and a backhaul network to core network 490. For example, resources may be shared between access links and backhaul links in the IAB network.

UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Figure 5:
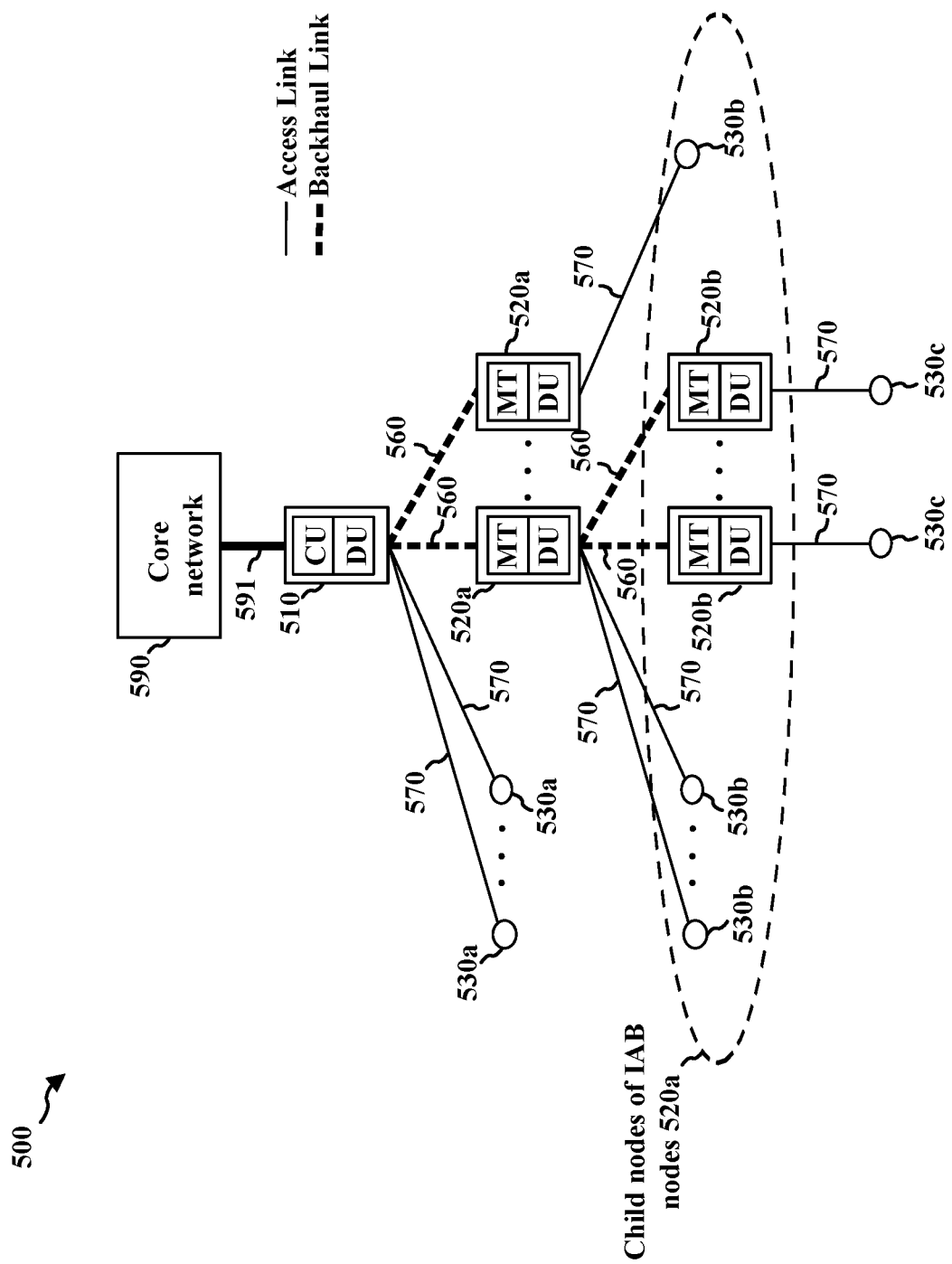
FIG. 5 is a diagram illustrating an IAB network and components thereof.

FIG. 5 is a diagram illustrating an IAB network 500 and components thereof. The IAB network 500 includes an IAB donor 510 and IAB nodes 520. The IAB nodes, as well as the IAB donor, may provide wireless access links to UEs 530.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node, scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node, the pattern of a parent IAB node comprising a DU that schedules a child IAB node/child UE may continue.

Figure 6:
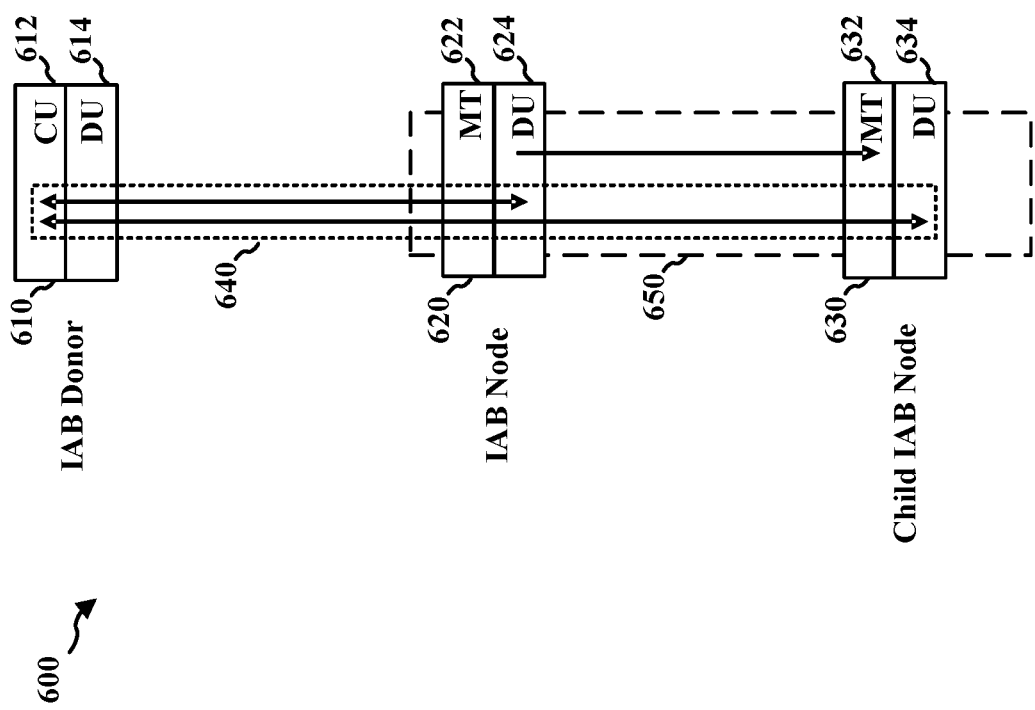
FIG. 6 is a diagram illustrating examples of interaction between an IAB donor, an IAB node, and a child IAB node.

FIG. 6 is a diagram 600 illustrating examples of interaction between an IAB donor 610, an IAB node 620, and a child IAB node 630. The CU 612 of the IAB donor 610 may provide centralized management of the resources available for communication of the IAB nodes. The CU 612 of the IAB donor 610 may allocate the resources semi-statically. Additionally or alternatively, the soft resources of a child node may be controlled in a distributed dynamic fashion by the parent of the child node (e.g., the DU 624 or 614 of the parent node). For example, the DU 624 of the IAB node 620 may allocate the soft resources of the child IAB node 630 through dynamic control signaling.

The MTs 622 and 632 may have resources that are downlink (DL) resources, uplink (UL) resources, or flexible (F) resources. The DUs 614, 624, and 634 may have hard DL resources, hard UL resources, and/or hard F resources. The DUs 614, 624, and 634 may have soft DL resources, soft UL resources, and/or soft flexible resources. In addition to hard or soft resources types, the DUs 614, 624, and 634 may have resources that are not available (NA) type resources.

The CU 612 of the IAB donor 610 may communicate with the DU 624 of the IAB node 620 and the DU 634 of the child IAB node 630 over an F1 interface 640. The F1 interface 640 may support exchanging information with or transferring encapsulated RRC messages to a child IAB node (e.g., the MT of a child of the receiving IAB node) (e.g., transferring an encapsulated RRC message for the child IAB node 630 to the DU 624 of the IAB node 620). In some aspects, the CU 612 may configure the resource pattern of the DU 624 of the IAB node 620 over the F1 interface 640.

The DU 624 of the IAB node 620 may communicate with the MT 632 of the child IAB node 630 over a Uu air interface 650. The Uu air interface 650 may support transferring RRC messages received from the CU 612 of the IAB donor 610 to the MT 632 of the child IAB node 630, and may support the DU 624 of the IAB node 620 dynamically scheduling the MT 632 of the child IAB node 630. In some aspects, the IAB node 620 may dynamically control the soft resources of the DU 634 of the child IAB node 630 over the Uu air interface 650.

Figure 7:
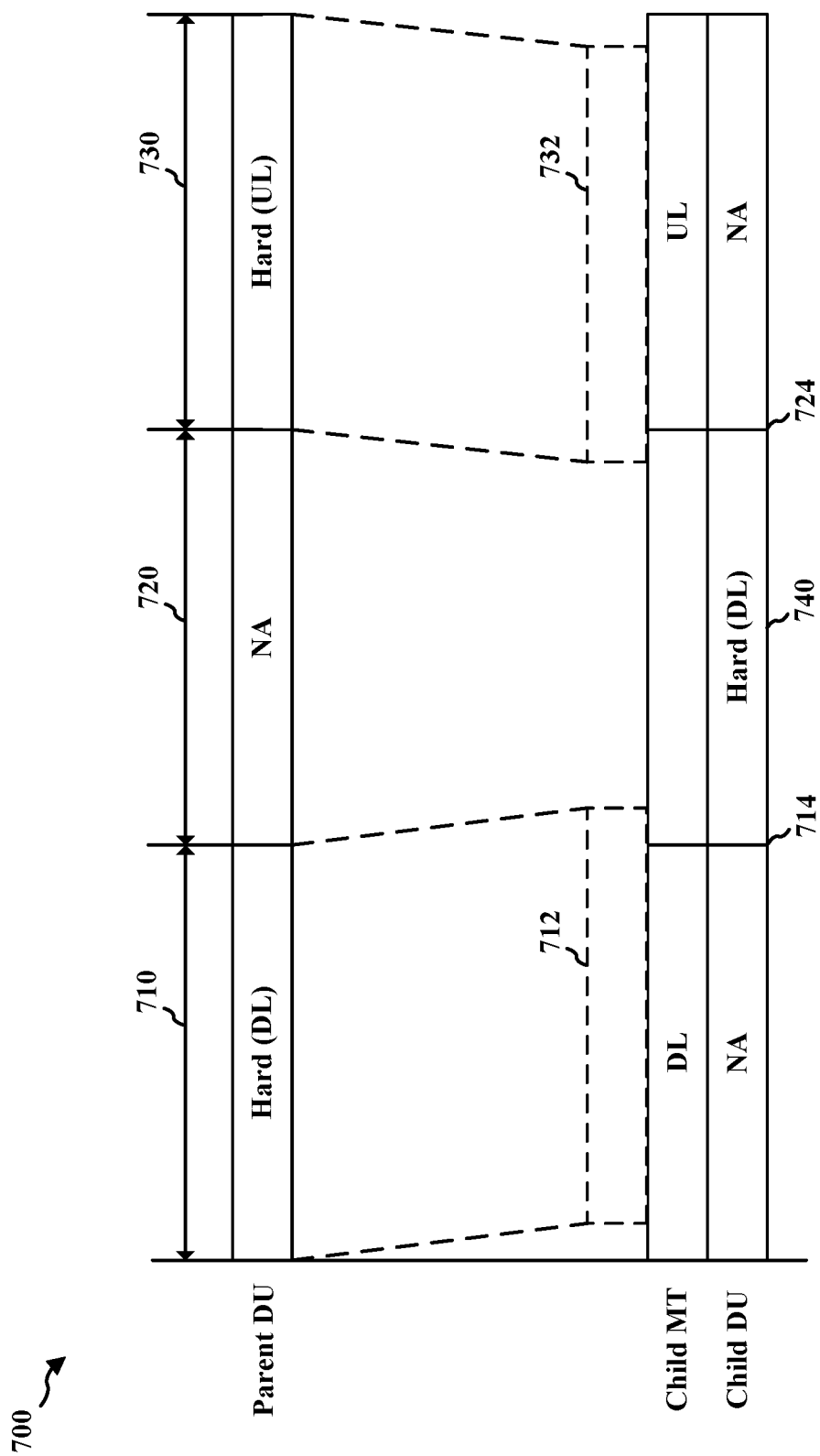
FIG. 7 is a diagram illustrating communication between a child IAB node and its parent.

FIG. 7 is a diagram 700 illustrating communication between a child IAB node and its parent. The child IAB node may be in TDD mode.

An IAB apparatus may utilize its MT to communicate with its parent IAB apparatus (e.g., the DU of the parent IAB node or IAB donor), and may utilize its DU to communicate with its children (e.g., child IAB nodes or UEs). Resources of a DU may be configured as UL, DL, or flexible (F). The DU may transmit downlink information to a grandchild IAB apparatus (e.g., the MT of a child IAB node or a UE) on resources configured as DL. The DU may receive uplink information from the grandchild IAB apparatus on resources configured as UL. The MT may determine whether resources configured as F will be used as DL or UL at a later time, for example based on receiving an indication (e.g, from the parent IAB apparatus or the IAB donor for the IAB network) whether resources configured as F should be used as DL or UL.

Resources of a DU may additionally be configured as hard, soft, or not available (NA), to avoid conflict with resources being utilized by the MT. When a resource is indicated as hard, the DU can assume it can use the resource regardless of the MT's configuration. The DU may determine whether to use the hard resource to communicate with the child IAB apparatus regardless of whether MT has an allocation from the parent IAB apparatus. In some aspects, the DU may decide to ignore the MT's allocation from the parent IAB apparatus and use the hard resource to communicate with its child node. In some aspects, the DU may decide to give priority to the MT to communicate with the parent IAB apparatus and not to use the hard resource to communicate with the grandchild IAB node. When a resource is indicated as NA, it is unavailable for use by the DU. When a resource is indicated as soft, the DU may determine whether it may utilize the resource based on whether doing so would impact the MT transmitting or receiving on the resource. A soft resource may be explicitly or implicitly indicated as available. A soft resource is explicitly indicated as available when a parent IAB apparatus indicates to the child IAB node that the resource will be available (e.g., the parent has not scheduled the MT of the child IAB node to transmit on the soft resource). A soft resource is implicitly indicated as available when the child IAB node determines that it's DU can utilize the soft resources without interfering with transmitting or receiving by the child IAB node's MT (e.g., without indication from the parent IAB apparatus).

The diagram 700 of FIG. 7 illustrates a parent IAB apparatus communicating with a child IAB node on a first set of time domain resources 710, a second set of time domain resources 720, and a third set of time domain resources 730. Specifically, the diagram 700 illustrates the configuration of the DU of the parent IAB apparatus ("Parent DU"), the configuration of the MT of the child IAB node ("Child MT"), and the configuration of the DU of the child IAB node ("Child DU").

The parent IAB node may transmit downlink data to the child IAB node on the first set of resources 710. The first set of resources 710 may be configured as hard for the parent DU to allow the parent DU to decide whether to use the resources 710 to transmit downlink data to the child IAB node regardless of operation of the MT of the parent IAB apparatus. The first set of resources 710 may be configured as DL for the child MT to receive the downlink data from the parent DU. The first set of resources 710 may be configured as NA for the child DU to prevent the child DU from interfering with the child MT receiving the downlink data from the parent DU.

The child IAB node may transmit downlink data to a child entity, such as another IAB node or a UE, on the second set of resources 720. The child DU may be configured as hard for the second set of resources 720, and the parent DU may be configured as NA for the second set of resources 720 so that the child MT and the parent DU may not communicate with one another on the second set of resources 720.

The child IAB node may transmit uplink data to the parent IAB node on the third set of resources 730. The third set of resources 730 may be configured as UL for the child MT to transmit the uplink data to the parent DU. The third set of resources 730 may be configured as NA for the child DU to prevent the child DU from interfering with the child MT transmitting the uplink data to the parent DU. The third set of resources 730 may be configured as hard for the parent DU so that the parent DU can decide whether to use the resources to receive uplink data from the child node regardless of operation of the MT of the parent IAB apparatus.

As the child IAB node is communicating utilizing its MT on the first set of resources 710 and communicating utilizing its DU on the second set of resources 720, the child IAB node performs a transition between its MT and DU at the time 714 between the two sets of resources. Similarly, as the child IAB node is communicating utilizing its DU on the second set of resources 720 and communicating utilizing its MT on the third set of resources 730, the child IAB node performs a transition between its DU and its MT at the time 724 between the two sets of resources.

The parent IAB apparatus and the child IAB node may utilize guard symbols at transition times (e.g., time 714 and time 724). A guard symbol may be a resource on which nothing is transmitted. An IAB node may utilize one or more different component (e.g., different transmitter(s), different receiver(s), or different antenna(s)) and/or different analog beams for its MT and its DU. The guard symbols may provide time for the IAB node to switch between components used for the MT and components used for the DU. The guard symbols may also prevent conflicts due where an MT and a DU of an IAB node are both supposed to be operating at the same time (e.g., due to propagation delay or timing advance).

For example, as illustrated in FIG. 7, although the parent DU transmits downlink data on the first set of resources 710, the transmission may actually be received at the child IAB node on resources 712, slightly delayed from the first set of resources 710. Some of the resources 712 overlap with the second set of resources 720 on which the child MT is configured to transmit downlink data to another device.

Guard symbols at the end of the resources 710 provided by the parent DU and/or at the beginning of the resources 740 provided by the child DU may allow the child node to transition from use of the MT to receive downlink data to use of the DU to transmit downlink data without conflict. Uplink data transmitted on resources 732 from the child IAB node to the parent DU may face similar challenges, and guard symbols at the end of resources 740 provided by the child DU and/or at the beginning of resources 730 provided by the parent DU may allow the child IAB node to transition from use of the DU to transmit downlink data to use of the MT to transmit uplink data without conflict.

FIG. 8 is a table 800 illustrating IAB node transition types. A transition type may be based on the configuration of the resources immediately before and immediately after the transition. A given resource may be configured for use by the MT or for use by the DU. Resources configured for use by the MT may be configured for receiving downlink data from a parent (DL Rx) or for transmitting uplink data to the parent (UL Tx). Resources configured for the DU may be configured for transmitting downlink data to a child (DL Tx) or for receiving uplink data from the child (UL Rx).

A transition from using the MT to receive downlink data (DL Rx) to using the DU to transmit downlink data (DL Tx) may be referred to as a Type 1 transition. A transition from using the MT to receive downlink data (DL Rx) to using the DU to receive uplink data (UL Rx) may be referred to as a Type 2 transition. A transition from using the MT to transmit uplink data (UL Tx) to using the DU to transmit downlink data (DL Tx) may be referred to as a Type 3 transition. A transition from using the MT to transmit uplink data (UL Tx) to using the DU to receive uplink data (UL Rx) may be referred to as a Type 4 transition. A transition from using the DU to transmit downlink data (DL Tx) to using the MT to receive downlink data (DL Rx) may be referred to as a Type 5 transition. A transition from using the DU to transmit downlink data (DL Tx) to using the MT to transmit uplink data (UL Tx) may be referred to as a Type 6 transition. A transition from using the DU to receive uplink data (UL Rx) to using the MT to receive downlink data (DL Rx) may be referred to as a Type 7 transition. A transition from using the DU to receive uplink data (UL Rx) to using the MT to transmit uplink data (UL Tx) may be referred to as a Type 8 transition.

The number of guard symbols provided at a transition time may be based on the transition type of the transition. The number of symbols provided for a given transition type may be based on the switching and signal propagation requirements for the transition. For example, in some aspects, transitions of Type 1, 4, 5, and 8 may receive guard symbols to provide for switching from the transmitter to the receiver. In some aspects, transitions of Type 1 and 2 may receive guard symbols to provide for a propagation delay based on the distance from the parent IAB apparatus. In some aspects, transitions of Type 7 and 8 may receive guard symbols to provide for a propagation delay based on the distance from the child IAB node or UE. In some aspects, transitions of Types 1-8 may receive guard symbols to provide for switching antennas. The number of guard symbols provided for a given transition type may be based on a GuardSymbolsDesired signal transmitted from the child IAB node to the parent IAB apparatus and on a GuardSymbolsProvided signal transmitted from the parent IAB apparatus to the child IAB node, which will be discussed further below.

Figure 9:
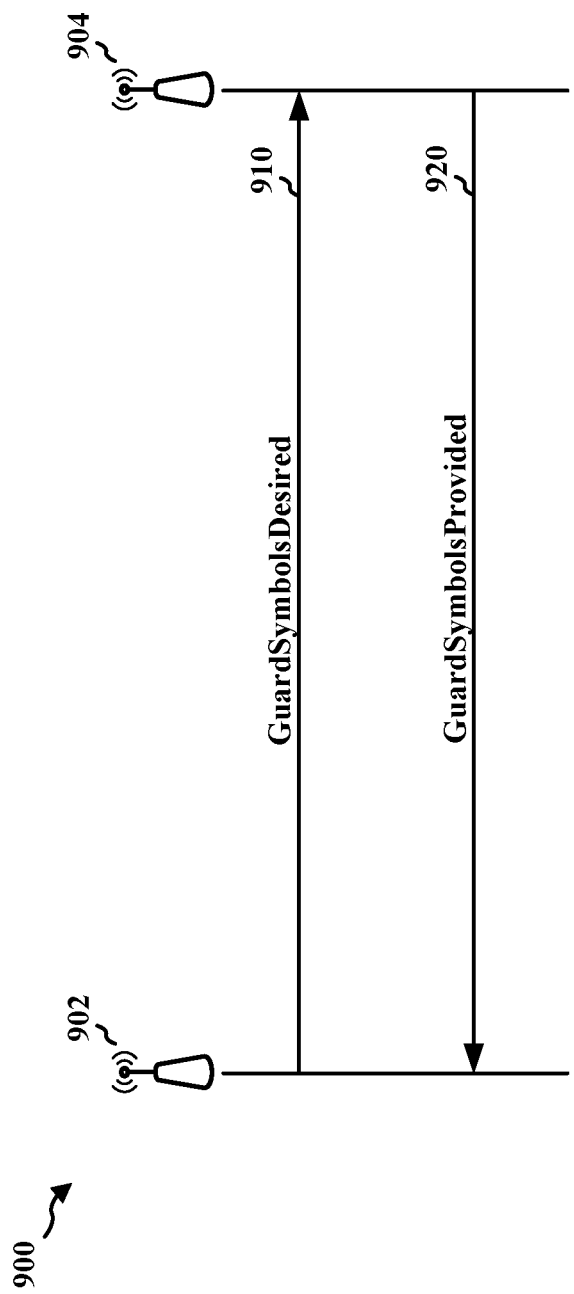
FIG. 9 is a communication diagram illustrating guard symbol signaling between a child IAB node and a parent IAB apparatus.

FIG. 9 is a communication diagram 900 illustrating guard symbol signaling between a child IAB node 902 and a parent IAB apparatus 904. The guard symbols for a transition may be located at the resources immediately before the transition, the resources immediately after the transition, or may be split between both the resources immediately before and immediately after the transition. The child IAB node 902 and the parent IAB apparatus 904 may communicate to determine how many of the guard symbols will be provided by the child IAB node 902 and how many of the guard symbols will be provided by the parent IAB apparatus 904.

The child IAB node 902 may have a set of GuardSymbolDesired values corresponding to different transition types, such as the Types 1-8 described above with respect to FIG. 8. The GuardSymbolsDesired values may identify the number of guard symbols which should be provided for the child IAB node 902 to perform a transition of that type. The child IAB node 902 may transmit a GuardSymbolsDesired signal 910 to the parent IAB apparatus 904. The GuardSymbolsDesired signal 910 may include some or all of the GuardSymbolsDesired values corresponding to transmission types. In some aspects, the GuardSymbolsDesired signal 910 may include one or more media access control (MAC) control elements (MAC CEs). In some aspects, if a value is not included for a transition type, zero guard symbols may be provided for that transition type.

The parent IAB apparatus 904 may transmit a GuardSymbolsProvided signal 920 to the child IAB node 902. The GuardSymbolsProvided signal 920 may include GuardSymbolsProvided values corresponding to transition types, such as transition Types 1-8. The GuardSymbolsProvided value for a transition type may indicate a number of guard symbols which the parent IAB apparatus 904 will provide when the child IAB node 902 performs a transmission of that type. The value included in the GuardSymbolsProvided signal 920 for a transition type may be equal to or less than the value included in the GuardSymbolsDesired signal 910 for that transition type. In some aspects, the value included in the GuardSymbolsProvided signal 920 may be based on resource utilization and/or performance impact. In some aspects, if no value is included for a transition type, the parent IAB apparatus 904 may provide zero guard symbols for transitions of that type.

When the child IAB node 902 performs a transition between use of its MT and use of its DU, the child IAB node 902 and the parent IAB apparatus 904 will provide guard symbols based on the GuardSymbolsDesired and GuardSymbolsProvided values. As a transition is between use of the DU of the child IAB node 902 and use of the MT of the child IAB node 902, the transition will be adjacent to one set of resources allocated to the MT for communication between the child IAB node 902 and the parent IAB apparatus 904, and a second set of resources allocated to the DU for communication between the child IAB node 902 and a child if the child IAB node 902. The parent IAB apparatus 904 and the child IAB node 902 will not transmit or receive on guard symbols allocated to the MT, the number of which will be based on the GuardSymbolsProvided value for that transition type. The child IAB node 902 will not transmit or receive on guard symbols allocated to the DU, the number of which will be based on the value for GuardSymbolsProvided and the value for GuardSymbolsDesired for that transition type. In some aspects, the number of guard symbols provided on the DU by the child IAB node 902 may be the difference between the GuardSymbolsDesired and the GuardSymbolsProvided.

Figure 10:
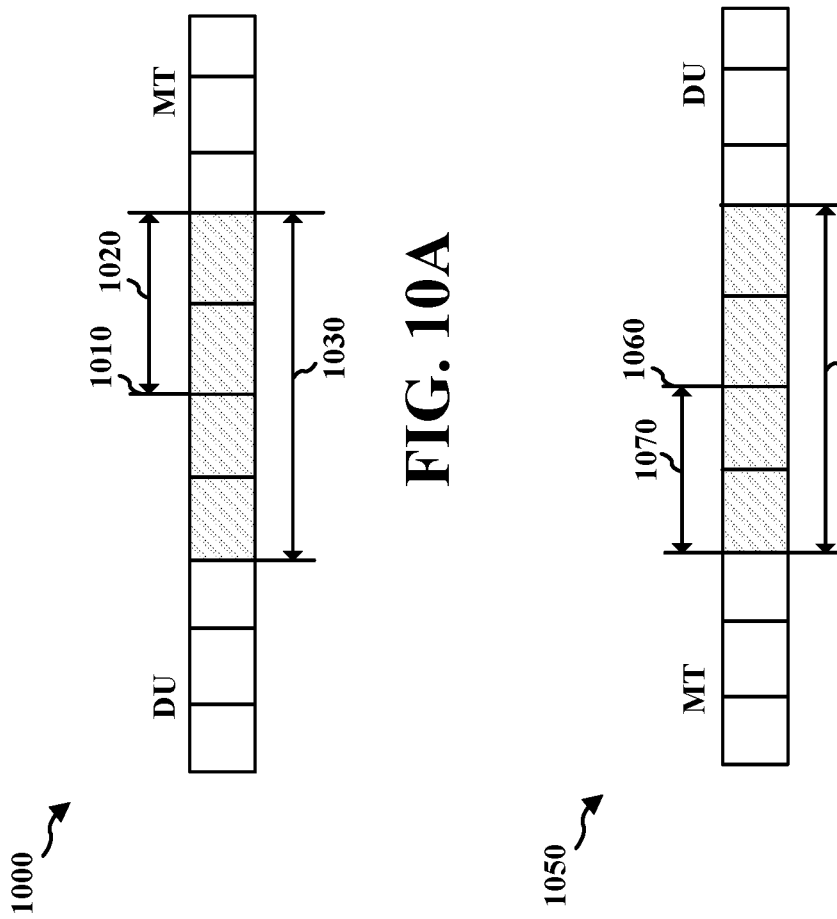
FIG. 10A is a diagram illustrating guard symbols at a transition from DU to MT.
FIG. 10B is a diagram illustrating guard symbols at a transition from MT to DU.

For example, FIG. 10A is a diagram 1000 illustrating guard symbols at a transition from DU to MT. The child IAB node may transition from use of its DU to use of its MT at a transition time 1010. The GuardSymbolsDesired value for transitions of the transition type may be four, and the GuardSymbolsProvided value may be two. Because the GuardSymbolsProvided value is two, neither the parent IAB apparatus nor the child IAB node transmit on the two symbols 1020 following the transition time 1010. Because the GuardSybolsDesired value is four and two guard symbols are being provided on the resources after the transition time 1010, the child IAB node may not transmit or receive on the two symbols before the transition time 1010, resulting in four guard symbols 1030 for the transition. The child IAB node may switch from operation of its DU to operation of its MT during the time associated with the four guard symbols 1030.

In another example, FIG. 10B is a diagram 1050 illustrating guard symbols at a transition from MT to DU. The child IAB node may transition from use of its MT to use of its DU at a transition time 1060. The GuardSymbolsDesired value for transitions of the transition type may be four, and the GuardSymbolsProvided value may be two. Because the GuardSymbolsProvided value is two, neither the parent IAB apparatus nor the child IAB node transmit on the two symbols 1070 before the transition time 1060. Because the GuardSybolsDesired value is four and two guard symbols are being provided on the resources before the transition time 1060, the child IAB node may not transmit or receive on the two symbols after the transition time 1060, resulting in four guard symbols 1080 for the transition. The child IAB node may switch from operation of its MT to operation of its DU during the time associated with the four guard symbols 1080.

Figure 11:
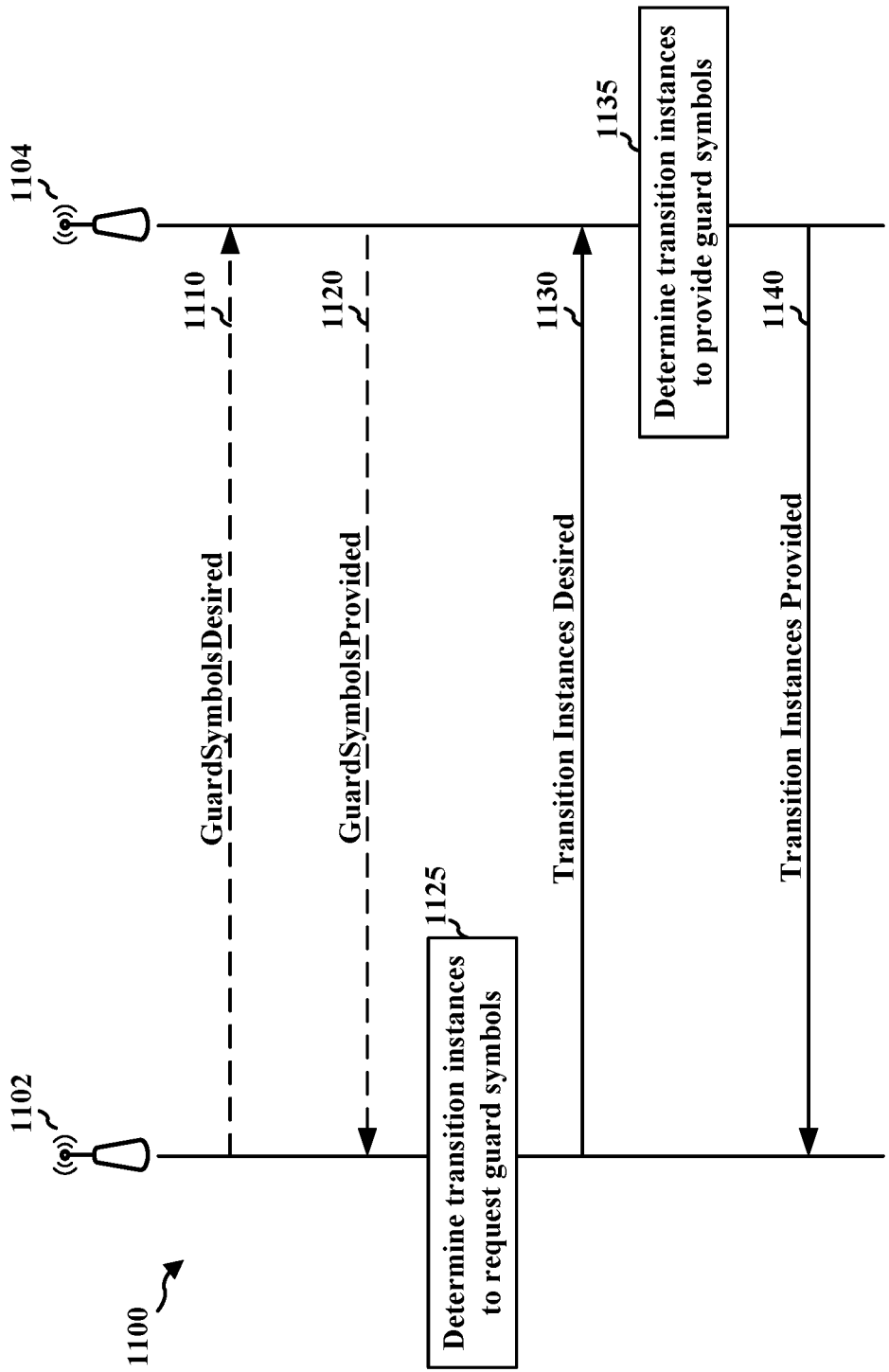
FIG. 11 is a communication diagram illustrating guard symbol signaling and transition instance signaling between a child IAB node and a parent IAB apparatus.

FIG. 11 is a communication diagram 1100 illustrating guard symbol signaling and transition instance signaling between a child IAB node 1102 and a parent IAB apparatus 1104. The parent IAB apparatus 1104 may be an IAB donor or an IAB node. In some aspects, the child IAB node 1102 and the parent IAB apparatus 1104 may specify which transition instances guard symbols should be provided at or will be provided at.

The child IAB node 1102 may transmit a GuardSymbolsDesired signal 1110 to the parent IAB apparatus 1104 indicating a number of guard symbols for different transition types, and the parent IAB apparatus 1104 may transmit a GuardSymbolsProvided signal 1120 to the child IAB node 1102 indicating a number of guard symbols which the parent IAB apparatus will supply for different transmission types. For example, this may be performed as described above with respect to FIG. 9.

As illustrated at 1125, the child IAB node 1102 may determine transition instances to request guard symbols. The child IAB node 1102 may determine not to request guard symbols for every transition it performs. For example, the child IAB node 1102 may determine that the child IAB node can provide the guard symbols for certain transitions without receiving guard symbols from the parent IAB apparatus, or the child IAB node 1102 may determine that no guard symbols are needed for certain transitions. The guard symbols may not be used for communication, which may reduce resource utilization. If guard symbols are provided by the parent IAB apparatus 1104, then resource utilization for the backhaul link between the parent IAB apparatus 1104 and the child IAB node 1102 (e.g., between the parent DU and child MT) may be reduced. If guard symbols are provided by the child IAB node 1102, the resource utilization for a child link (e.g., between the child DU and a MT of a grandchild IAB apparatus) may be reduced. To balance the resource utilization between the parent backhaul link and the child link, the child IAB node 1102 may request guard symbols from parent node for a subset of transition instances, and may provide the guard symbols for remaining transition instance itself. The child IAB node 1102 may determine that it will request guard symbols from the parent IAB apparatus 1104 for other transition instances.

A parent IAB apparatus 1104 may not know all scheduling information for a child IAB node 1102. For example, the parent IAB apparatus 1104 may know the semi-static resource configuration (e.g., configured as hard, soft, or NA, and TDD) for resources for the child IAB node 1102, but may not know more detailed scheduling information. The parent IAB apparatus 1104 may not be able to identify every transition instance accurately. In some aspects, the child IAB node 1102 may request guard symbols for transition instances based on scheduling information of the child IAB node 1102 (e.g., based on the child IAB node's slot format indication (SFI) or scheduling plan for the resources).

Some transition instances may be ambiguous to the parent IAB apparatus 1104 based on the knowledge available to the parent IAB apparatus 1104. For example, where a symbol adjacent to a transition instance and allocated to the DU of the child IAB node 1102 is configured as flexible, the parent IAB node may not know what transition type the resource instance will have. In some aspects, the request for guard symbols for a transition instance may resolve ambiguities or may include additional information which resolves ambiguities. For example, a request for guard symbols for a transition instance may indicate the transition type of the transition instance. The child IAB node 1102 may determine the transition type of the transition instance based on the child DU's SFI and/or scheduling information.

The child IAB node 1102 may transmit a transition instances desired signal 1130 to the parent IAB apparatus 1104. The transition instances desired signal 1130 may identify a set of transition instances at which the child IAB node 1102 will transition between use of its MT and use of its DU, and which the child IAB node 1102 determined at 1125 to request guard symbols from the parent IAB apparatus 1104.

The transition instances desired signal 1130 may include transition times for the transition instances identified. In some aspects, the transition instances desired signal 1130 may include a bitmap identifying the transition times of the transition instances. In some aspects, the bitmap may include a bit corresponding to each instance of the child IAB node 1102 transitioning between its MT and its DU, and the value of a given bit may indicate whether the child IAB node 1102 is requesting guard symbols for that transition. In some aspects, the bits of the bitmap may correspond to resources (e.g., each bit is one slot or one symbol) and the value of a given bit may indicate whether a transition will occur at that resource for which the child IAB node 1102 requests guard symbols. In some aspects, the transition instances desired symbols may include a set of resource indices identifying resources at which a transition will occur for which the child IAB node 1102 requests guard symbols.

The transition instances desired signal 1130 may also include additional information for each indicated transition instance. In some aspects, the transition instances desired signal 1130 may identify a transition type for identified transition instances. The transition type may be one of the transition Types 1-8 described above with respect to FIG. 8. The child IAB node 1102 may be able to provide a transition type for a transition instance based on information unavailable to the parent IAB apparatus 1104, such as the child IAB node's MAC layer scheduling information, so the child IAB node 1102 may provide the transition type for a transition instance when it would not otherwise be available to the parent IAB apparatus 1104. The parent IAB apparatus 1104 may utilize the transition type to determine whether to provide guard symbols for the transition instance, or to determine how may guard symbols to provide for the transition instance, e.g., as described above with respect to FIG. 9.

In some aspects, the transition instances desired signal 1130 may include a composite transition type for identified transmission instances. A composite transition type may include one or more of the transition Types 1-8 described above with respect to FIG. 8. For example, a composite transition type for a given transition instance may identify both transition Type 2 (transitioning from DL resources on the MT to UL resources on the DU) and transition Type 1 (transitioning from DL resources on the MT to DL resources on the DU). In some aspects, the child IAB node 1102 may request guard symbols for a transition which includes a flexible resource (e.g., allocated to the DU) adjacent to the transition time. The child IAB node 1102 may transmit the transition instances desired signal 1130 to the parent IAB apparatus 1104 before determining whether the F resource will be converted to UL or to DL. The transition instances desired signal 1130 may include a composite transition type indicating the transition type that would result if the F resource is converted to UL and the transition type that would result if the F resource is converted to DL.

The parent IAB apparatus 1104 may utilize the composite transition type to determine whether to provide guard symbols for the transition instance, or to determine how many guard symbols to provide for the transition instance. For example, the parent IAB apparatus 1104 may determine the guard symbols requested value for each transition type identified in the composite transition type (e.g., based on the GuardSymbolsDesired signal 1110), and may select one of the values. In some aspects, the parent IAB apparatus 1104 may select the highest value. In some aspects, the parent IAB apparatus 1104 may select the lowest value.

In some aspects, the transition instances desired signal 1130 may include an index for identified transmission instances. The index may correspond to a predefined or preconfigured set of values for a number of requested guard symbols. The parent IAB apparatus 1104 may utilize the index to determine the guard symbols requested for the transition instance based on the predefined or preconfigured set of values.

In some aspects, the information for a transition included in the transition instances desired signal 1130 may depend on the characteristics of the indicated transition. For example, the information included may be based on a transition type of the transition or on the number of gap symbols requested for the transition type. In some aspects, the transition instances desired signal 1130 may include multiple transition instances desired signals corresponding to different transition types, and the transition instances desired signal for a given transition type may indicate transition instances having the given transition type. In some aspects, the transition instances desired signal 1130 may include multiple transition instances desired signals corresponding to different numbers of guard symbols to be provided for the identified transmission instance.

In some aspects, as illustrated at 1135, the parent IAB apparatus 1104 may determine transition instances to provide guard symbols. The selection criterion may be based on factors including resource utilization of parent backhaul link, reserved resources for cell-specific signals (e.g., the parent IAB apparatus 1104 may not provide guard symbols for a transition instance due to presence of cell-specific signals). In some aspects, the parent IAB apparatus 1104 may determine the transition instances to provide guard symbols based on the transition instances indicated in the transition instances desired signal 1110 by selecting some or all of the indicated transmission instances. In some aspects, the IAB apparatus 1104 may determine the transmission instances to provide guard symbols independently.

The parent IAB apparatus 1104 may transmit a transition instances provided signal 1140 to the child IAB node 1102. The transition instances provided signal 1140 may identify a set of transition instances at which the parent IAB apparatus 1104 will provide guard symbols. The transition instances provided signal 1140 may include a transition time associated with the indicated transition instances. In some aspects, the transition instances provided signal 1140 may also include a number of guard symbols for the identified transition instances identifying the number of guard symbols which the parent IAB apparatus 1104 will provide at the transition instance.

The child IAB node 1102 may receive the transition instances provided signal 1140 and may utilize it to determine how many guard symbols the child IAB node 1102 will provide at each of the identified transition instances. For example, the child IAB node 1102 may compare the number of guards symbols that will be received at a transition instance to the number of guard symbols desired for that transition instance, and may determine to provide the remaining guard symbols.

In some aspects, the transition instances desired signal 1130 and the transition instances provided signal 1140 may be media access control (MAC) control elements (CE). The transition instances desired signal 1130 and the transition instances provided signal 1140 may indicate a periodic pattern for the signals which is applied until a new MAC CE is received.

In some aspects, the transition instances desired signal 1130 and the transition instances provided signal 1140 may include L1 signaling. The child IAB node 1102 may transmit the transition instances desired signal 1130 at an allocated physical resource, and the parent IAB apparatus 1104 may monitor for the transition instances desired signal 1130 on the allocated physical resource. The parent IAB apparatus 1104 may transmit the transition instances provided signal 1140 at an allocated physical resource, and the child IAB node 1102 may monitor for the transition instances provided signal 1140 at the allocated physical resource. If no signal is received, a default value may be assumed (e.g., guard symbols are requested/provided for all transition instances). If received, the transition instances identified in the transition instances desired signal 1130 and/or the transition instances provided signal 1140 may be observed for a set or preconfigured time span.

Figure 12:
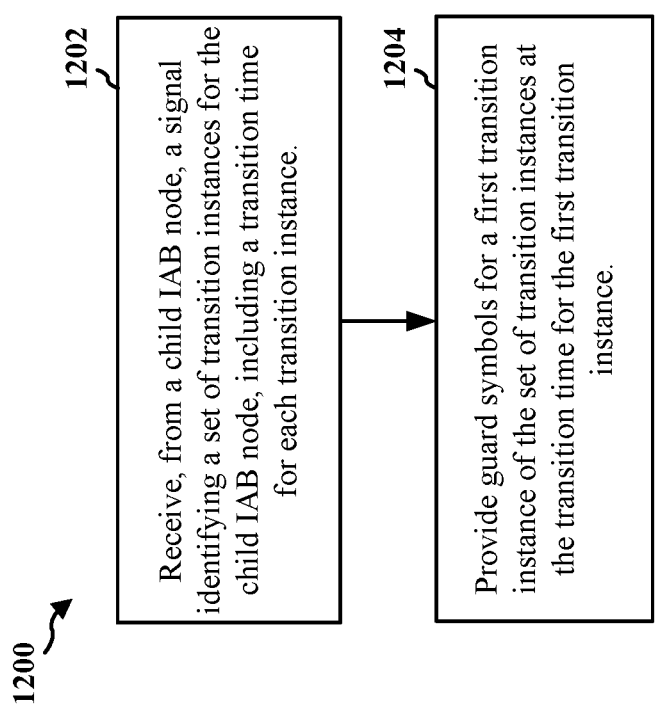
FIG. 12 is a flowchart of a method of wireless communication.

FIG. 12 is a flowchart 1200 of a method of wireless communication. The method may be performed by an IAB apparatus (e.g., the parent IAB apparatus 1104, the IAB donor 410, 510, or 610, the IAB node 420, 520, or 620).

At 1202, the IAB apparatus receives, from a child IAB node, a signal identifying a set of transition instances for the child IAB node to transition between use of a mobile terminal of the child IAB node and use of a distributed unit of the child IAB node. The signal includes a transition time for each transition instance of the set of transition instances. In some aspects, the transition time may identify a slot where the first transmission will occur. In some aspects, the transition time may identify a symbol where the first transition will occur. In some aspects, the signal may include a transition type for each transition instance of the set of transition instances, a transition type corresponding to a first resource type for the resource immediately before the transition time and to a second resource type for the resource immediately after the transition time, and providing guard symbols for the first transition instance may include providing a number of guard symbols based on the transition type for the first transition instance. In some aspects, the first resource type may be allocated for use by a MT of the child IAB node, and the second resource type may be allocated for use by a DU of the child IAB node. In some aspects, the second resource type may be allocated for use by a MT of the child IAB node, and the first resource type may be allocated for use by a DU of the child IAB node. In some aspects, the signal comprises a media access control control element. In some aspects, the signal may include L1 signaling. In some aspects, the IAB apparatus is an IAB donor or an IAB node.

At 1204, the IAB apparatus provides guard symbols for a first transition instance of the set of transition instances at the transition time for the first transition instance. In some aspects, the IAB apparatus provides guard symbols for each transition instance of the set of transition instances. In some aspects, the signal may include an index for each transition instance of the set of transition instances, and providing guard symbols for the first transition instance may include providing a number of guard symbols based on the index for the first transition instance. In some aspects, the signal may include a composite transition type for each transition instance of the set of transition instances, a composite transition type corresponding to a plurality of transition types, a transition type corresponding to a first resource type for the resource immediately before the transition time and to a second resource type for the resource immediately after the transition time, and providing guard symbols for the first transition instances may include providing a number of guard symbols based on the composite transition type for the first transition instance.

In some aspects, the IAB apparatus transmits, to the child IAB node, a second signal identifying a second set of transmission instances for the child IAB node to transition between use of the mobile terminal of the child IAB node and use of the distributed unit of the child IAB node, the signal comprising a value corresponding to the first transition instance, wherein providing guard symbols for the first transition instances comprises providing a number of guard symbols based on the value.

Figure 13:
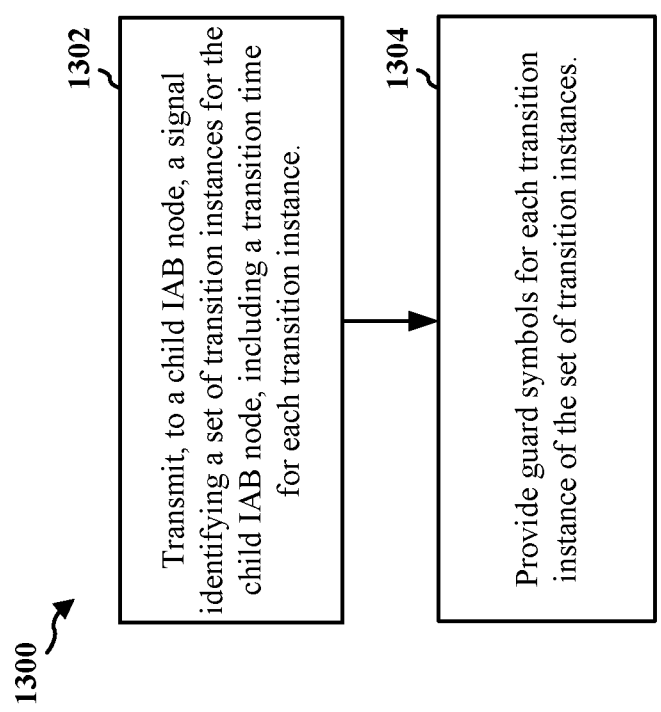
FIG. 13 is a flowchart of a method of wireless communication.

FIG. 13 is a flowchart 1300 of a method of wireless communication. The method may be performed by an IAB apparatus (e.g., the parent IAB apparatus 1104, the IAB donor 410, 510, or 610, the IAB node 420, 520, or 620).

At 1302, the IAB apparatus transmits, to a child IAB node, a signal identifying a set of transition instances for the child IAB node to transition between use of a mobile terminal of the child IAB node and use of a distributed unit of the child IAB node. The signal includes a transition time for each transition instance of the set of transition instances. In some aspects, the signal comprises L1 signaling. In some aspects, the IAB apparatus may be an IAB donor or an IAB node.

At 1304, the IAB apparatus provides guard symbols for each transition instance of the set of transition instances at the corresponding transition time. In some aspects, the signal may include a number of guard symbols for each transition instance of the set of transition instances, and providing guard symbols for each transition instance of the set of transition instances may include providing the number of guard symbols included in the signal for the corresponding transition instance.

Figure 14:
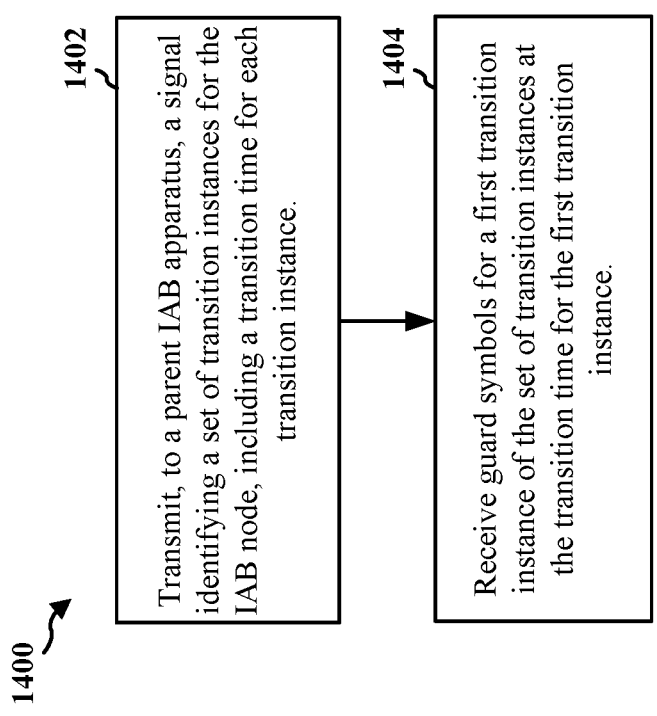
FIG. 14 is a flowchart of a method of wireless communication.

FIG. 14 is a flowchart 1400 of a method of wireless communication. The method may be performed by an IAB node (e.g., the child IAB node 1102, the IAB node 410, 510, or 610).

At 1402, the IAB node transmits, to a parent IAB apparatus, a signal identifying a set of transition instances for the IAB node to transition between use of a mobile terminal of the IAB node and use of a distributed unit of the IAB node. The signal includes a transition time for each transition instance of the set of transition instances. In some aspects, the transition time may identify a slot where the first transmission will occur. In some aspects, the transition time may identify a symbol where the first transition will occur. In some aspects, the signal may include a transition type for each transition instance of the set of transition instances, a transition type corresponding to a first resource type for the resource immediately before the transition time and to a second resource type for the resource immediately after the transition time, and receiving guard symbols for the first transition instance may include receiving a number of guard symbols based on the transition type for the first transition instance. In some aspects, the first resource type may be allocated for use by a MT of the IAB node, and the second resource type may be allocated for use by a DU of the IAB node. In some aspects, the second resource type may be allocated for use by a MT of the IAB node, and the first resource type may be allocated for use by a DU of the IAB node. In some aspects, the signal comprises a media access control control element. In some aspects, the signal may include L1 signaling. In some aspects, the parent IAB apparatus is an IAB donor or an IAB node.

At 1404, the IAB node receives guard symbols from the parent IAB apparatus for a first transition instance of the set of transition instances at the transition time for the first transition instance. In some aspects, the IAB node receives guard symbols for each transition instance of the set of transition instances. In some aspects, the signal may include an index for each transition instance of the set of transition instances, and receiving guard symbols for the first transition instance may include receiving a number of guard symbols based on the index for the first transition instance. In some aspects, the signal may include a composite transition type for each transition instance of the set of transition instances, a composite transition type corresponding to a plurality of transition types, a transition type corresponding to a first resource type for the resource immediately before the transition time and to a second resource type for the resource immediately after the transition time, and receiving guard symbols for the first transition instances may include receiving a number of guard symbols based on the composite transition type for the first transition instance.

In some aspects, the IAB node transmits, to the IAB node, a second signal identifying a second set of transmission instances for the IAB node to transition between use of the mobile terminal of the IAB node and use of the distributed unit of the IAB node, the signal comprising a value corresponding to the first transition instance, wherein receiving guard symbols for the first transition instances comprises receiving a number of guard symbols based on the value.

Figure 15:
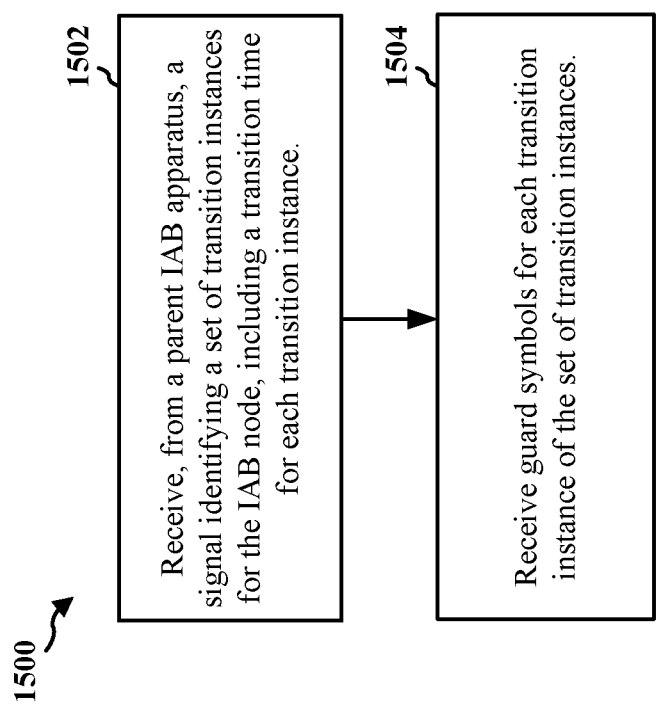
FIG. 15 is a flowchart of a method of wireless communication.

FIG. 15 is a flowchart 1500 of a method of wireless communication. The method may be performed by an IAB node (e.g., the child IAB node 1102, the IAB node 410, 510, or 610).

At 1502, the IAB node receives, from a parent IAB apparatus, a signal identifying a set of transition instances for the IAB node to transition between use of a mobile terminal of the IAB node and use of a distributed unit of the IAB node. The signal includes a transition time for each transition instance of the set of transition instances. In some aspects, the signal comprises L1 signaling. In some aspects, the parent IAB apparatus may be an IAB donor or an IAB node.

At 1504, the IAB node receives guard symbols from the parent IAB apparatus for each transition instance of the set of transition instances at the corresponding transition time. In some aspects, the signal may include a number of guard symbols for each transition instance of the set of transition instances, and receiving guard symbols for each transition instance of the set of transition instances may include receiving the number of guard symbols included in the signal for the corresponding transition instance.

Figure 16:
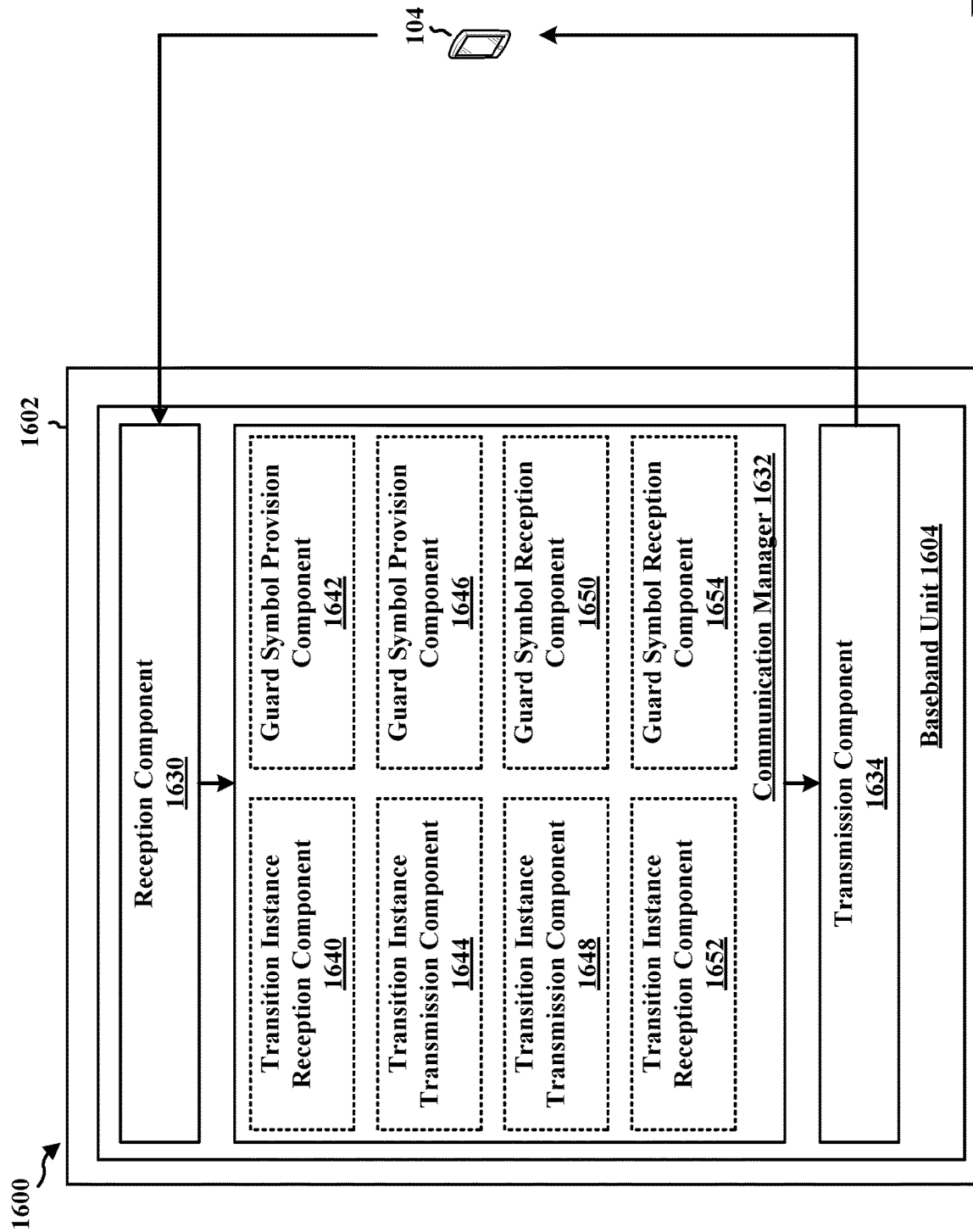
FIG. 16 is a diagram illustrating an example of a hardware implementation for an apparatus.

FIG. 16 is a diagram 1600 illustrating an example of a hardware implementation for an apparatus 1602. The apparatus 1602 is a BS and includes a baseband unit 1604. The baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the BS 310 and may include the memory 376 and/or at least one of the TX processor 316, the RX processor 370, and the controller/processor 375.

The apparatus 1602 may be a part of an IAB network and may be or may include an IAB donor and/or an IAB node.

In some aspects, the communication manager 1632 includes a transition instance reception component 1640 that receives, from a child IAB node, a signal identifying a set of transition instances for the child IAB node to transition between use of a mobile terminal of the child IAB node and use of a distributed unit of the child IAB node, the signal comprising a transition time for each transition instance of the set of transition instances, e.g., as described in connection with 1202 of FIG. 12. The communication manager 1632 further includes a guard symbol provision component 1642 that provides guard symbols for a first transition instance of the set of transition instances at the transition time for the first transition instance, e.g., as described in connection with 1204 of FIG. 12.

In some aspects, the communication manager 1632 includes a transition instance transmission component 1644 that transmits, to a child IAB node, a signal identifying a set of transition instances for the child IAB node to transition between use of a mobile terminal of the child IAB node and use of a distributed unit of the child IAB node, the signal comprising a transition time for each transition instance of the set of transition instances, e.g., as described in connection with 1302 of FIG. 13. The communication manager 1632 further includes a guard symbol provision component 1646 that provides guard symbols for each transition instance of the set of transition instances at the corresponding transition time, e.g., as described in connection with 1304 of FIG. 13.

In some aspects, the communication manager 1632 includes a transition instance transmission component 1648 that transmits, to a parent IAB apparatus, a signal identifying a set of transition instances for the IAB node to transition between use of a mobile terminal of the IAB node and use of a distributed unit of the IAB node, the signal comprising a transition time for each transition instance of the set of transition instances, e.g., as described in connection with 1402 of FIG. 14. The communication manager 1632 further includes a guard symbol reception component 1650 that receives guard symbols from the parent IAB apparatus for a first transition instance of the set of transition instances at the transition time for the first transition instance, e.g., as described in connection with 1404 of FIG. 14.

In some aspects, the communication manager 1632 includes a transition instance reception component 1652 that receives, from a parent IAB apparatus, a signal identifying a set of transition instances for the IAB node to transition between use of a mobile terminal of the IAB node and use of a distributed unit of the IAB node, the signal comprising a transition time for each transition instance of the set of transition instances, e.g., as described in connection with 1502 of FIG. 15. The communication manager 1632 further includes a guard symbol reception component 1654 that receives guard symbols from the parent IAB apparatus for each transition instance of the set of transition instances at the corresponding transition time, e.g., as described in connection with 1504 of FIG. 15.

The apparatus may include additional components that perform each of the blocks of the algorithm in the aforementioned flowcharts of FIGS. 12-15. As such, each block in the aforementioned flowcharts of FIGS. 12-15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In some configurations, the apparatus 1602, and in particular the baseband unit 1604, includes means for receiving, from a child IAB node, a signal identifying a set of transition instances for the child IAB node to transition between use of a mobile terminal of the child IAB node and use of a distributed unit of the child IAB node, the signal comprising a transition time for each transition instance of the set of transition instances; and means for providing guard symbols for a first transition instance of the set of transition instances at the transition time for the first transition instance.

In some configurations, the apparatus 1602, and in particular the baseband unit 1604, includes means for transmitting, to a child IAB node, a signal identifying a set of transition instances for the child IAB node to transition between use of a mobile terminal of the child IAB node and use of a distributed unit of the child IAB node, the signal comprising a transition time for each transition instance of the set of transition instances; and means for providing guard symbols for each transition instance of the set of transition instances at the corresponding transition time.

In some configurations, the apparatus 1602, and in particular the baseband unit 1604, includes means for transmitting, to a parent JAB apparatus, a signal identifying a set of transition instances for the IAB node to transition between use of a mobile terminal of the IAB node and use of a distributed unit of the JAB node, the signal comprising a transition time for each transition instance of the set of transition instances; and means for receiving guard symbols from the parent JAB apparatus for a first transition instance of the set of transition instances at the transition time for the first transition instance.

In some configurations, the apparatus 1602, and in particular the baseband unit 1604, includes means for receiving, from a parent JAB apparatus, a signal identifying a set of transition instances for the IAB node to transition between use of a mobile terminal of the IAB node and use of a distributed unit of the JAB node, the signal comprising a transition time for each transition instance of the set of transition instances; and means for receiving guard symbols from the parent JAB apparatus for each transition instance of the set of transition instances at the corresponding transition time.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Implementation examples are described in the following numbered clauses. The following examples are illustrative only and may be combined with aspects of other embodiments or teachings described herein, without limitation.

1. A method of wireless communication at an integrated access and backhaul (IAB) apparatus, comprising: receiving, from a child IAB node, a signal identifying a set of transition instances for the child IAB node to transition between use of a mobile terminal of the child IAB node and use of a distributed unit of the child IAB node, the signal comprising a transition time for each transition instance of the set of transition instances; and providing guard symbols for a first transition instance of the set of transition instances at the transition time for the first transition instance.

2. The method of clause 1, wherein the transition time identifies a slot that the first transition instance occurs in.

3. The method of clause 1, wherein the transition time identifies a symbol that the first transition instance occurs in.

4. The method of any of clauses 1-3, wherein the signal comprises an index for each transition instance of the set of transition instances, and wherein providing guard symbols for the first transition instance comprises providing a number of guard symbols based on the index for the first transition instance.

5. The method of any of clauses 1-4, wherein the signal comprises a transition type for each transition instance of the set of transition instances, a transition type corresponding to a first resource type for the resource immediately before the transition time and to a second resource type for the resource immediately after the transition time, and wherein providing guard symbols for the first transition instance comprises providing a number of guard symbols based on the transition type for the first transition instance.

6. The method of any of clauses 1-5, wherein the first resource type is allocated for use by a mobile termination (MT) of the child IAB node, and wherein the second resource type is allocated for use by a distributed unit (DU) of the child IAB node.

7. The method of any of clauses 1-5, wherein the second resource type is allocated for use by a mobile termination (MT) of the child IAB node, and wherein the first resource type is allocated for use by a distributed unit (DU) of the child IAB node.

8. The method of any of clauses 1-3, wherein the signal comprises a composite transition type for each transition instance of the set of transition instances, a composite transition type corresponding to a plurality of transition types, a transition type corresponding to a first resource type for the resource immediately before the transition time and to a second resource type for the resource immediately after the transition time, and wherein providing guard symbols for the first transition instances comprises providing a number of guard symbols based on the composite transition type for the first transition instance.

9. The method of any of clauses 1-8, wherein the signal comprises a media access control control element.

10. The method of any of clauses 1-8, wherein the signal comprises L1 signaling.

11. The method of any of clauses 1-10, wherein the IAB apparatus is an IAB donor or an IAB node.

12. The method of any of clauses 1-11, wherein the IAB apparatus provides guard symbols for each transition instance of the set of transition instances.

13. The method of any of clauses 1-12, further comprising transmitting, to the child IAB node, a second signal identifying a second set of transmission instances for the child IAB node to transition between use of the mobile terminal of the child IAB node and use of the distributed unit of the child IAB node, the signal comprising a value corresponding to the first transition instance, wherein providing guard symbols for the first transition instances comprises providing a number of guard symbols based on the value.

14. An apparatus for communication at an IAB apparatus, comprising: means for receiving, from a child IAB node, a signal identifying a set of transition instances for the child IAB node to transition between use of a mobile terminal of the child IAB node and use of a distributed unit of the child IAB node, the signal comprising a transition time for each transition instance of the set of transition instances; and means for providing guard symbols for a first transition instance of the set of transition instances at the transition time for the first transition instance.

15. The apparatus of clause 14, further comprising means for performing the method of any of clauses 2-13.

16. An apparatus for wireless communication at an integrated access and backhaul (IAB) apparatus, comprising: a memory; and at least one processor coupled to the memory and configured to: receive, from a child IAB node, a signal identifying a set of transition instances for the child IAB node to transition between use of a mobile terminal of the child IAB node and use of a distributed unit of the child IAB node, the signal comprising a transition time for each transition instance of the set of transition instances; and provide guard symbols for a first transition instance of the set of transition instances at the transition time for the first transition instance.

17. The apparatus of clause 16, wherein the transition time identifies a slot that the first transition instance occurs in.

18. The apparatus of clause 16, wherein the transition time identifies a symbol that the first transition instance occurs in.

19. The apparatus of any of clauses 16-18, wherein the signal comprises an index for each transition instance of the set of transition instances, and wherein providing guard symbols for the first transition instance comprises providing a number of guard symbols based on the index for the first transition instance.

20. The apparatus of any of clauses 16-19, wherein the signal comprises a transition type for each transition instance of the set of transition instances, a transition type corresponding to a first resource type for the resource immediately before the transition time and to a second resource type for the resource immediately after the transition time, and wherein providing guard symbols for the first transition instance comprises providing a number of guard symbols based on the transition type for the first transition instance.

21. The apparatus of any of clauses 16-20, wherein the first resource type is allocated for use by a mobile termination (MT) of the child IAB node, and wherein the second resource type is allocated for use by a distributed unit (DU) of the child IAB node.

22. The apparatus of any of clauses 16-20, wherein the second resource type is allocated for use by a mobile termination (MT) of the child IAB node, and wherein the first resource type is allocated for use by a distributed unit (DU) of the child IAB node.

23. The apparatus of any of clauses 16-19, wherein the signal comprises a composite transition type for each transition instance of the set of transition instances, a composite transition type corresponding to a plurality of transition types, a transition type corresponding to a first resource type for the resource immediately before the transition time and to a second resource type for the resource immediately after the transition time, and wherein providing guard symbols for the first transition instances comprises providing a number of guard symbols based on the composite transition type for the first transition instance.

24. The apparatus of any of clauses 16-23, wherein the signal comprises a media access control control element.

25. The apparatus of any of clauses 16-23, wherein the signal comprises L1 signaling.

26. The apparatus of any of clauses 16-25, wherein the IAB apparatus is an IAB donor or an IAB node.

27. The apparatus of any of clauses 16-26, wherein the IAB apparatus provides guard symbols for each transition instance of the set of transition instances.

28. The apparatus of any of clauses 16-27, wherein the processor is further configured to transmit, to the child IAB node, a second signal identifying a second set of transmission instances for the child IAB node to transition between use of the mobile terminal of the child IAB node and use of the distributed unit of the child IAB node, the signal comprising a value corresponding to the first transition instance, wherein providing guard symbols for the first transition instances comprises providing a number of guard symbols based on the value.

29. A non-transitory computer-readable medium storing computer executable code for wireless communication at a user equipment, the code when executed by a processor cause the processor to perform the method of any of clauses 1-13.

30. A method of wireless communication at an integrated access and backhaul (IAB) apparatus, comprising: transmitting, to a child IAB node, a signal identifying a set of transition instances for the child IAB node to transition between use of a mobile terminal of the child IAB node and use of a distributed unit of the child IAB node, the signal comprising a transition time for each transition instance of the set of transition instances; and providing guard symbols for each transition instance of the set of transition instances at the corresponding transition time.

31. The method of clause 30 wherein the signal comprises a number of guard symbols for each transition instance of the set of transition instances, and wherein providing guard symbols for each transition instance of the set of transition instances comprises providing the number of guard symbols included in the signal for the corresponding transition instance.

32. The method of any of clauses 30-31, wherein the signal comprises L1 signaling.

33. The method of any of clauses 30-32, wherein the IAB apparatus is an IAB donor or an IAB node.

34. The method of any of clauses 30-33, wherein the transition time identifies a slot that the first transition occurs in.

35. The method of any of clauses 30-33, wherein the transition time identifies a symbol that the first transition occurs in.

36. The method of any of clauses 30-35, wherein the signal comprises an index for each transition instance of the set of transition instances, and wherein providing guard symbols for the first transition instance comprises providing a number of guard symbols based on the index for the first transition instance.

37. The method of any of clauses 30-36, wherein the signal comprises a transition type for each transition instance of the set of transition instances, a transition type corresponding to a first resource type for the resource immediately before the transition time and to a second resource type for the resource immediately after the transition time, and wherein providing guard symbols for the first transition instance comprises providing a number of guard symbols based on the transition type for the first transition instance.

38. The method of any of clauses 30-37, wherein the first resource type is allocated for use by a mobile termination (MT) of the child IAB node, and wherein the second resource type is allocated for use by a distributed unit (DU) of the child IAB node.

39. The method of any of clauses 30-37, wherein the second resource type is allocated for use by a mobile termination (MT) of the child IAB node, and wherein the first resource type is allocated for use by a distributed unit (DU) of the child IAB node.

40. The method of any of clauses 30-36, wherein the signal comprises a composite transition type for each transition instance of the set of transition instances, a composite transition type corresponding to a plurality of transition types, a transition type corresponding to a first resource type for the resource immediately before the transition time and to a second resource type for the resource immediately after the transition time, and wherein providing guard symbols for the first transition instances comprises providing a number of guard symbols based on the composite transition type for the first transition instance.

41. The method of any of clauses 30-31 and 33-40, wherein the signal comprises a media access control control element.

42. An apparatus for communication at an IAB apparatus, comprising: means for transmitting, to a child IAB node, a signal identifying a set of transition instances for the child IAB node to transition between use of a mobile terminal of the child IAB node and use of a distributed unit of the child IAB node, the signal comprising a transition time for each transition instance of the set of transition instances; and means for providing guard symbols for each transition instance of the set of transition instances at the corresponding transition time.

43. The apparatus of clause 42, further comprising means for performing the method of any of clauses 31-41.

44. An apparatus for wireless communication at an integrated access and backhaul (IAB) apparatus, comprising: a memory; and at least one processor coupled to the memory and configured to: transmit, to a child IAB node, a signal identifying a set of transition instances for the child IAB node to transition between use of a mobile terminal of the child IAB node and use of a distributed unit of the child IAB node, the signal comprising a transition time for each transition instance of the set of transition instances; and provide guard symbols for each transition instance of the set of transition instances at the corresponding transition time.

45. The apparatus of clause 44 wherein the signal comprises a number of guard symbols for each transition instance of the set of transition instances, and wherein providing guard symbols for each transition instance of the set of transition instances comprises providing the number of guard symbols included in the signal for the corresponding transition instance.

46. The apparatus of any of clauses 44-45, wherein the signal comprises L1 signaling.

47. The apparatus of any of clauses 44-46, wherein the IAB apparatus is an IAB donor or an IAB node.

48. The apparatus of any of clauses 44-47, wherein the transition time identifies a slot that the first transition occurs in.

49. The apparatus of any of clauses 44-47, wherein the transition time identifies a symbol that the first transition occurs in.

50. The apparatus of any of clauses 44-49, wherein the signal comprises an index for each transition instance of the set of transition instances, and wherein providing guard symbols for the first transition instance comprises providing a number of guard symbols based on the index for the first transition instance.

51. The apparatus of any of clauses 44-50, wherein the signal comprises a transition type for each transition instance of the set of transition instances, a transition type corresponding to a first resource type for the resource immediately before the transition time and to a second resource type for the resource immediately after the transition time, and wherein providing guard symbols for the first transition instance comprises providing a number of guard symbols based on the transition type for the first transition instance.

52. The apparatus of any of clauses 44-51, wherein the first resource type is allocated for use by a mobile termination (MT) of the child IAB node, and wherein the second resource type is allocated for use by a distributed unit (DU) of the child IAB node.

53. The apparatus of any of clauses 44-51, wherein the second resource type is allocated for use by a mobile termination (MT) of the child IAB node, and wherein the first resource type is allocated for use by a distributed unit (DU) of the child IAB node.

54. The apparatus of any of clauses 44-50, wherein the signal comprises a composite transition type for each transition instance of the set of transition instances, a composite transition type corresponding to a plurality of transition types, a transition type corresponding to a first resource type for the resource immediately before the transition time and to a second resource type for the resource immediately after the transition time, and wherein providing guard symbols for the first transition instances comprises providing a number of guard symbols based on the composite transition type for the first transition instance.

55. The apparatus of any of clauses 44-45 and 46-54, wherein the signal comprises a media access control control element.

56. A non-transitory computer-readable medium storing computer executable code for wireless communication at a user equipment, the code when executed by a processor cause the processor to perform the method of any of clauses 30-41.

57. A method of wireless communication at an integrated access and backhaul (IAB) node, comprising: transmitting, to a parent IAB apparatus, a signal identifying a set of transition instances for the IAB node to transition between use of a mobile terminal of the IAB node and use of a distributed unit of the IAB node, the signal comprising a transition time for each transition instance of the set of transition instances; and receiving guard symbols from the parent IAB apparatus for a first transition instance of the set of transition instances at the transition time for the first transition instance.

58. The method of clause 57, wherein the transition time identifies a slot that the first transition instance occurs in.

59. The method of clause 57, wherein the transition time identifies a symbol that the first transition instance occurs in.

60. The method of any of clauses 57-59, wherein the signal comprises an index for each transition instance of the set of transition instances, and wherein receiving guard symbols for the first transition instance comprises receiving a number of guard symbols based on the index for the first transition instance.

61. The method of any of clauses 57-60, wherein the signal comprises a transition type for each transition instance of the set of transition instances, a transition type corresponding to a first resource type for the resource immediately before the transition time and to a second resource type for the resource immediately after the transition time, and wherein receiving guard symbols for the first transition instance comprises receiving a number of guard symbols based on the transition type for the first transition instance.

62. The method of any of clauses 57-61, wherein the first resource type is allocated for use by a mobile termination (MT) of the IAB node, and wherein the second resource type is allocated for use by a distributed unit (DU) of the IAB node.

63. The method of any of clauses 57-61, wherein the second resource type is allocated for use by a mobile termination (MT) of the IAB node, and wherein the first resource type is allocated for use by a distributed unit (DU) of the IAB node.

64. The method of any of clauses 57-60, wherein the signal comprises a composite transition type for each transition instance of the set of transition instances, a composite transition type corresponding to a plurality of transition types, a transition type corresponding to a first resource type for the resource immediately before the transition time and to a second resource type for the resource immediately after the transition time, and wherein providing guard symbols for the first transition instances comprises providing a number of guard symbols based on the composite transition type for the first transition instance.

65. The method of any of clauses 57-64, wherein the signal comprises a media access control control element.

66. The method of any of clauses 57-64, wherein the signal comprises L1 signaling.

67. The method of any of clauses 57-66, wherein the parent IAB apparatus is an IAB donor or an IAB node.

68. The method of any of clauses 57-67, wherein the parent IAB apparatus provides guard symbols for each transition instance of the set of transition instances.

69. The method of any of clauses 57-68, further comprising receiving, from the parent IAB apparatus, a second signal identifying a second set of transmission instances for the IAB node to transition between use of the mobile terminal of the IAB node and use of the distributed unit of the IAB node, the signal comprising a value corresponding to the first transition instance, wherein receiving guard symbols for the first transition instances comprises receiving a number of guard symbols based on the value.

70. An apparatus for communication at an IAB node, comprising: means for transmitting, to a parent IAB apparatus, a signal identifying a set of transition instances for the IAB node to transition between use of a mobile terminal of the IAB node and use of a distributed unit of the IAB node, the signal comprising a transition time for each transition instance of the set of transition instances; and means for receiving guard symbols from the parent IAB apparatus for a first transition instance of the set of transition instances at the transition time for the first transition instance.

71. The apparatus of clause 70, further comprising means for performing the method of any of clauses 58-69.

72. An apparatus for wireless communication at an integrated access and backhaul (IAB) node, comprising: a memory; and at least one processor coupled to the memory and configured to: transmit, to a parent IAB apparatus, a signal identifying a set of transition instances for the IAB node to transition between use of a mobile terminal of the IAB node and use of a distributed unit of the IAB node, the signal comprising a transition time for each transition instance of the set of transition instances; and receive guard symbols from the parent IAB apparatus for a first transition instance of the set of transition instances at the transition time for the first transition instance.

73. The apparatus of clause 72, wherein the transition time identifies a slot that the first transition instance occurs in.

74. The apparatus of clause 72, wherein the transition time identifies a symbol that the first transition instance occurs in.

75. The apparatus of any of clauses 72-74, wherein the signal comprises an index for each transition instance of the set of transition instances, and wherein receiving guard symbols for the first transition instance comprises receiving a number of guard symbols based on the index for the first transition instance.

76. The apparatus of any of clauses 72-75, wherein the signal comprises a transition type for each transition instance of the set of transition instances, a transition type corresponding to a first resource type for the resource immediately before the transition time and to a second resource type for the resource immediately after the transition time, and wherein receiving guard symbols for the first transition instance comprises receiving a number of guard symbols based on the transition type for the first transition instance.

77. The apparatus of any of clauses 72-76, wherein the first resource type is allocated for use by a mobile termination (MT) of the IAB node, and wherein the second resource type is allocated for use by a distributed unit (DU) of the IAB node.

78. The apparatus of any of clauses 72-76, wherein the second resource type is allocated for use by a mobile termination (MT) of the IAB node, and wherein the first resource type is allocated for use by a distributed unit (DU) of the IAB node.

79. The apparatus of any of clauses 72-75, wherein the signal comprises a composite transition type for each transition instance of the set of transition instances, a composite transition type corresponding to a plurality of transition types, a transition type corresponding to a first resource type for the resource immediately before the transition time and to a second resource type for the resource immediately after the transition time, and wherein providing guard symbols for the first transition instances comprises providing a number of guard symbols based on the composite transition type for the first transition instance.

80. The apparatus of any of clauses 72-79, wherein the signal comprises a media access control control element.

81. The apparatus of any of clauses 72-79, wherein the signal comprises L1 signaling.

82. The apparatus of any of clauses 72-81, wherein the parent IAB apparatus is an IAB donor or an IAB node.

83. The apparatus of any of clauses 72-82, wherein the parent IAB apparatus provides guard symbols for each transition instance of the set of transition instances.

84. The apparatus of any of clauses 72-83, wherein the processor is further configured to receive, from the parent IAB apparatus, a second signal identifying a second set of transmission instances for the IAB node to transition between use of the mobile terminal of the IAB node and use of the distributed unit of the IAB node, the signal comprising a value corresponding to the first transition instance, wherein receiving guard symbols for the first transition instances comprises receiving a number of guard symbols based on the value.

85. A non-transitory computer-readable medium storing computer executable code for wireless communication at a user equipment, the code when executed by a processor cause the processor to perform the method of any of clauses 57-69.

86. A method of wireless communication at an integrated access and backhaul (IAB) node, comprising: receiving, from a parent IAB apparatus, a signal identifying a set of transition instances for the IAB node to transition between use of a mobile terminal of the IAB node and use of a distributed unit of the IAB node, the signal comprising a transition time for each transition instance of the set of transition instances; and receiving guard symbols from the parent IAB apparatus for each transition instance of the set of transition instances at the corresponding transition time.

87. The method of clause 86 wherein the signal comprises a number of guard symbols for each transition instance of the set of transition instances, and wherein receiving guard symbols for each transition instance of the set of transition instances comprises receiving the number of guard symbols included in the signal for the corresponding transition instance.

88. The method of any of clauses 86-87, wherein the signal comprises L1 signaling.

89. The method of any of clauses 86-88, wherein the parent IAB apparatus is an IAB donor or an IAB node.

90. The method of any of clauses 86-89, wherein the transition time identifies a slot that the first transition occurs in.

91. The method of any of clauses 86-89, wherein the transition time identifies a symbol that the first transition occurs in.

92. The method of any of clauses 86-91, wherein the signal comprises an index for each transition instance of the set of transition instances, and wherein receiving guard symbols for the first transition instance comprises receiving a number of guard symbols based on the index for the first transition instance.

93. The method of any of clauses 86-92, wherein the signal comprises a transition type for each transition instance of the set of transition instances, a transition type corresponding to a first resource type for the resource immediately before the transition time and to a second resource type for the resource immediately after the transition time, and wherein receiving guard symbols for the first transition instance comprises receiving a number of guard symbols based on the transition type for the first transition instance.

94. The method of any of clauses 86-93, wherein the first resource type is allocated for use by a mobile termination (MT) of the IAB node, and wherein the second resource type is allocated for use by a distributed unit (DU) of the IAB node.

95. The method of any of clauses 86-93, wherein the second resource type is allocated for use by a mobile termination (MT) of the IAB node, and wherein the first resource type is allocated for use by a distributed unit (DU) of the IAB node.

96. The method of any of clauses 86-92, wherein the signal comprises a composite transition type for each transition instance of the set of transition instances, a composite transition type corresponding to a plurality of transition types, a transition type corresponding to a first resource type for the resource immediately before the transition time and to a second resource type for the resource immediately after the transition time, and wherein receiving guard symbols for the first transition instances comprises receiving a number of guard symbols based on the composite transition type for the first transition instance.

97. The method of any of clauses 86-87 and 88-96, wherein the signal comprises a media access control control element.

98. An apparatus for communication at an IAB node, comprising: means for receiving, from a parent IAB apparatus, a signal identifying a set of transition instances for the IAB node to transition between use of a mobile terminal of the IAB node and use of a distributed unit of the IAB node, the signal comprising a transition time for each transition instance of the set of transition instances; and means for receiving guard symbols from the parent IAB apparatus for each transition instance of the set of transition instances at the corresponding transition time.

99. The apparatus of clause 98, further comprising means for performing the method of any of clauses 87-97.

100. An apparatus for wireless communication at an integrated access and backhaul (IAB) node, comprising: a memory; and at least one processor coupled to the memory and configured to: receiving, from a parent IAB apparatus, a signal identifying a set of transition instances for the IAB node to transition between use of a mobile terminal of the IAB node and use of a distributed unit of the IAB node, the signal comprising a transition time for each transition instance of the set of transition instances; and receiving guard symbols from the parent IAB apparatus for each transition instance of the set of transition instances at the corresponding transition time.

101. The apparatus of clause 100 wherein the signal comprises a number of guard symbols for each transition instance of the set of transition instances, and wherein receiving guard symbols for each transition instance of the set of transition instances comprises receiving the number of guard symbols included in the signal for the corresponding transition instance.

102. The apparatus of any of clauses 100-101, wherein the signal comprises L1 signaling.

103. The apparatus of any of clauses 100-102, wherein the parent IAB apparatus is an IAB donor or an IAB node.

104. The apparatus of any of clauses 100-103, wherein the transition time identifies a slot that the first transition occurs in.

105. The apparatus of any of clauses 100-103, wherein the transition time identifies a symbol that the first transition occurs in.

106. The apparatus of any of clauses 100-105, wherein the signal comprises an index for each transition instance of the set of transition instances, and wherein receiving guard symbols for the first transition instance comprises receiving a number of guard symbols based on the index for the first transition instance.

107. The apparatus of any of clauses 100-106, wherein the signal comprises a transition type for each transition instance of the set of transition instances, a transition type corresponding to a first resource type for the resource immediately before the transition time and to a second resource type for the resource immediately after the transition time, and wherein receiving guard symbols for the first transition instance comprises receiving a number of guard symbols based on the transition type for the first transition instance.

108. The apparatus of any of clauses 100-107, wherein the first resource type is allocated for use by a mobile termination (MT) of the IAB node, and wherein the second resource type is allocated for use by a distributed unit (DU) of the IAB node.

109. The apparatus of any of clauses 100-107, wherein the second resource type is allocated for use by a mobile termination (MT) of the IAB node, and wherein the first resource type is allocated for use by a distributed unit (DU) of the IAB node.

110. The apparatus of any of clauses 100-106, wherein the signal comprises a composite transition type for each transition instance of the set of transition instances, a composite transition type corresponding to a plurality of transition types, a transition type corresponding to a first resource type for the resource immediately before the transition time and to a second resource type for the resource immediately after the transition time, and wherein receiving guard symbols for the first transition instances comprises receiving a number of guard symbols based on the composite transition type for the first transition instance.

111. The apparatus of any of clauses 100-110, wherein the signal comprises a media access control control element.

112. A non-transitory computer-readable medium storing computer executable code for wireless communication at a user equipment, the code when executed by a processor cause the processor to perform the method of any of clauses 86-97.

What is claimed is:

1. A method of wireless communication at an integrated access and backhaul (IAB) apparatus, comprising:
    receiving from a child IAB node or transmitting to the child IAB node a signal identifying a set of transition instances for the child IAB node to transition between use of a mobile terminal of the child IAB node and use of a distributed unit of the child IAB node, the signal comprising a transition time for each transition instance of the set of transition instances; and
    providing guard symbols for a first transition instance of the set of transition instances at the transition time for the first transition instance.

2. The method of claim 1, wherein the signal comprises an index for each transition instance of the set of transition instances, and wherein providing guard symbols for the first transition instance comprises providing a number of guard symbols based on the index for the first transition instance.

3. The method of claim 1, wherein the signal comprises a transition type for each transition instance of the set of transition instances, a transition type corresponding to a first resource type for the resource immediately before the transition time and to a second resource type for the resource immediately after the transition time, and wherein providing guard symbols for the first transition instance comprises providing a number of guard symbols based on the transition type for the first transition instance.

4. The method of claim 3, wherein the first resource type is allocated for use by a mobile termination (MT) of the child IAB node, and wherein the second resource type is allocated for use by a distributed unit (DU) of the child IAB node.

5. The method of claim 3, wherein the second resource type is allocated for use by a mobile termination (MT) of the child IAB node, and wherein the first resource type is allocated for use by a distributed unit (DU) of the child IAB node.

6. The method of claim 1, wherein the signal comprises a composite transition type for each transition instance of the set of transition instances, a composite transition type corresponding to a plurality of transition types, a transition type corresponding to a first resource type for the resource immediately before the transition time and to a second resource type for the resource immediately after the transition time, and wherein providing guard symbols for the first transition instances comprises providing a number of guard symbols based on the composite transition type for the first transition instance.

7. The method of claim 1, further comprising providing guard symbols for each transition instance of the set of transition instances at the corresponding transition time.

8. The method of claim 7, wherein the signal comprises a number of guard symbols for each transition instance of the set of transition instances, and wherein providing guard symbols for each transition instance of the set of transition instances comprises providing the number of guard symbols included in the signal for the corresponding transition instance.

9. The method of claim 1, further comprising transmitting, to the child IAB node, a second signal identifying a second set of transmission instances for the child IAB node to transition between use of the mobile terminal of the child IAB node and use of the distributed unit of the child IAB node, the signal comprising a value corresponding to the first transition instance, wherein providing guard symbols for the first transition instances comprises providing a number of guard symbols based on the value.

10. The method of claim 1, further comprising:
    receiving a request from the child IAB node for a subset of transition instances, wherein the child IAB node provides the guard symbols for remaining transition instances.

11. A method of wireless communication at an integrated access and backhaul (IAB) node, comprising:
    transmitting to a parent IAB apparatus or receiving from the parent IAB apparatus a signal identifying a set of transition instances for the IAB node to transition between use of a mobile terminal of the IAB node and use of a distributed unit of the IAB node, the signal comprising a transition time for each transition instance of the set of transition instances; and
    receiving guard symbols from the parent IAB apparatus for a first transition instance of the set of transition instances at the transition time for the first transition instance.

12. The method of claim 11, wherein the signal comprises an index for each transition instance of the set of transition instances, and wherein receiving guard symbols for the first transition instance comprises receiving a number of guard symbols based on the index for the first transition instance.

13. The method of claim 11, wherein the signal comprises a transition type for each transition instance of the set of transition instances, a transition type corresponding to a first resource type for the resource immediately before the transition time and to a second resource type for the resource immediately after the transition time, and wherein receiving guard symbols for the first transition instance comprises receiving a number of guard symbols based on the transition type for the first transition instance.

14. The method of claim 13, wherein the first resource type is allocated for use by a mobile termination (MT) of the IAB node, and wherein the second resource type is allocated for use by a distributed unit (DU) of the IAB node.

15. The method of claim 13, wherein the second resource type is allocated for use by a mobile termination (MT) of the IAB node, and wherein the first resource type is allocated for use by a distributed unit (DU) of the IAB node.

16. The method of claim 11, wherein the signal comprises a composite transition type for each transition instance of the set of transition instances, a composite transition type corresponding to a plurality of transition types, a transition type corresponding to a first resource type for the resource immediately before the transition time and to a second resource type for the resource immediately after the transition time, and wherein providing guard symbols for the first transition instances comprises providing a number of guard symbols based on the composite transition type for the first transition instance.

17. The method of claim 11, further comprising receiving guard symbols from the parent IAB apparatus for each transition instance of the set of transition instances at the corresponding transition time.

18. The method of claim 17, wherein the signal comprises a number of guard symbols for each transition instance of the set of transition instances, and wherein receiving guard symbols for each transition instance of the set of transition instances comprises receiving the number of guard symbols included in the signal for the corresponding transition instance.

19. The method of claim 11, further comprising receiving, from the parent IAB apparatus, a second signal identifying a second set of transmission instances for the IAB node to transition between use of the mobile terminal of the IAB node and use of the distributed unit of the IAB node, the signal comprising a value corresponding to the first transition instance, wherein receiving guard symbols for the first transition instances comprises receiving a number of guard symbols based on the value.

20. An apparatus for wireless communication at an integrated access and backhaul (IAB) apparatus, comprising:
a memory; and
at least one processor coupled to the memory and configured to:
receive from a child IAB node or transmit to the child IAB node a signal identifying a set of transition instances for the child IAB node to transition between use of a mobile terminal of the child IAB node and use of a distributed unit of the child IAB node, the signal comprising a transition time for each transition instance of the set of transition instances; and
provide guard symbols for a first transition instance of the set of transition instances at the transition time for the first transition instance.

21. The apparatus of claim 20, wherein the signal comprises a transition type for each transition instance of the set of transition instances, a transition type corresponding to a first resource type for the resource immediately before the transition time and to a second resource type for the resource immediately after the transition time, and wherein providing guard symbols for the first transition instance comprises providing a number of guard symbols based on the transition type for the first transition instance.

22. The apparatus of claim 20, wherein the signal comprises a composite transition type for each transition instance of the set of transition instances, a composite transition type corresponding to a plurality of transition types, a transition type corresponding to a first resource type for the resource immediately before the transition time and to a second resource type for the resource immediately after the transition time, and wherein providing guard symbols for the first transition instances comprises providing a number of guard symbols based on the composite transition type for the first transition instance.

23. The apparatus of claim 20, wherein the at least one processor is further configured to provide guard symbols for each transition instance of the set of transition instances at the corresponding transition time.

24. The apparatus of claim 23, wherein the signal comprises a number of guard symbols for each transition instance of the set of transition instances, and wherein providing guard symbols for each transition instance of the set of transition instances comprises providing the number of guard symbols included in the signal for the corresponding transition instance.

25. The apparatus of claim 20, wherein the at least one processor is further configured to transmit, to the child IAB node, a second signal identifying a second set of transmission instances for the child IAB node to transition between use of the mobile terminal of the child IAB node and use of the distributed unit of the child IAB node, the signal comprising a value corresponding to the first transition instance, wherein providing guard symbols for the first transition instances comprises providing a number of guard symbols based on the value.

26. An apparatus for wireless communication at an integrated access and backhaul (IAB) node, comprising:
a memory; and
at least one processor coupled to the memory and configured to:
transmit to a parent IAB apparatus or receive from the parent IAB apparatus a signal identifying a set of transition instances for the IAB node to transition between use of a mobile terminal of the IAB node and use of a distributed unit of the IAB node, the signal comprising a transition time for each transition instance of the set of transition instances; and
receive guard symbols from the parent IAB apparatus for a first transition instance of the set of transition instances at the transition time for the first transition instance.

27. The apparatus of claim 26, wherein the signal comprises a transition type for each transition instance of the set of transition instances, a transition type corresponding to a first resource type for the resource immediately before the transition time and to a second resource type for the resource immediately after the transition time, and wherein receiving guard symbols for the first transition instance comprises receiving a number of guard symbols based on the transition type for the first transition instance.

28. The apparatus of claim 26, wherein the signal comprises a composite transition type for each transition instance of the set of transition instances, a composite transition type corresponding to a plurality of transition types, a transition type corresponding to a first resource type for the resource immediately before the transition time and to a second resource type for the resource immediately after the transition time, and wherein providing guard symbols for the first transition instances comprises providing a number of guard symbols based on the composite transition type for the first transition instance.

29. The apparatus of claim 26, wherein the at least one processor is further configured to receive guard symbols from the parent IAB apparatus for each transition instance of the set of transition instances at the corresponding transition time.

30. The apparatus of claim 29, wherein the signal comprises a number of guard symbols for each transition instance of the set of transition instances, and wherein receiving guard symbols for each transition instance of the set of transition instances comprises receiving the number of guard symbols included in the signal for the corresponding transition instance.

31. The apparatus of claim 26, wherein the at least one processor is further configured to receive, from the parent IAB apparatus, a second signal identifying a second set of transmission instances for the IAB node to transition between use of the mobile terminal of the IAB node and use of the distributed unit of the IAB node, the signal comprising a value corresponding to the first transition instance, wherein receiving guard symbols for the first transition instances comprises receiving a number of guard symbols based on the value.

* * * * *